United States Patent
Pietarinen et al.

(10) Patent No.: US 12,165,533 B2
(45) Date of Patent: Dec. 10, 2024

(54) SYSTEM AND METHOD FOR DYNAMIC DISPLAY OF LEGEND

(71) Applicant: The Boeing Company, Chicago, IL (US)

(72) Inventors: Seppo Pietarinen, Helsinki (FI); Kathryn Thomas, Portland, ME (US)

(73) Assignee: The Boeing Company, Arlington, VA (US)

( * ) Notice: Subject to any disclaimer, the term of this patent is extended or adjusted under 35 U.S.C. 154(b) by 421 days.

(21) Appl. No.: 17/645,398

(22) Filed: Dec. 21, 2021

(65) Prior Publication Data

US 2023/0196928 A1    Jun. 22, 2023

(51) Int. Cl.
*G08G 5/00* (2006.01)
*G01W 1/02* (2006.01)
*G01W 1/00* (2006.01)

(52) U.S. Cl.
CPC ............ *G08G 5/0091* (2013.01); *G01W 1/02* (2013.01); *G08G 5/0021* (2013.01); *G08G 5/003* (2013.01); *G01W 2001/003* (2013.01)

(58) Field of Classification Search
CPC .... G08G 5/0091; G08G 5/0021; G08G 5/003; G01W 1/02; G01W 2001/003; G06T 11/206; G06T 2200/24; G06T 2219/2012; G06T 17/05; G06T 19/20; G01C 21/3826; G01C 21/20; G06F 9/451; G06F 3/04842
USPC .......................................................... 701/14
See application file for complete search history.

(56) References Cited

U.S. PATENT DOCUMENTS

| | | | |
|---|---|---|---|
| 7,027,898 B1 * | 4/2006 | Leger ................... | G01W 1/04 |
| | | | 701/538 |
| D676,863 S | 2/2013 | Ho et al. | |
| D685,810 S | 7/2013 | Way et al. | |
| D708,205 S | 7/2014 | Maloney et al. | |
| D708,633 S | 7/2014 | Capua et al. | |

(Continued)

FOREIGN PATENT DOCUMENTS

| | | | |
|---|---|---|---|
| CA | 2344217 | * | 3/2000 |
| JP | 2014215731 A | | 11/2014 |

OTHER PUBLICATIONS

Cliff Mass Weather Blog, Jun. 6, 2013, cliffmass.blogspot.com, retrieved May 16, 2023, https://cliffmass.blogspot.com/2013/06/evaporation-versus-precipitation-which.html (Year: 2013).

(Continued)

*Primary Examiner* — Muhammad Shafi
(74) *Attorney, Agent, or Firm* — Neal, Gerber & Eisenberg LLP

(57) ABSTRACT

Systems and methods for dynamically adjusting a legend are provided. One system comprises a display unit; a user input device configured to receive a first input indicating a first altitude value; one or more processors; and a memory configured to store one or more programs, the one or more programs being configured for execution by the one or more processors and including instructions for: retrieving weather information corresponding to the first input; generating a command signal for displaying a legend having a color-code or shading-code associated with a plurality of attributes included in the retrieved weather information; and displaying the legend, on the display unit, in association with the retrieved weather information.

17 Claims, 13 Drawing Sheets

(56) References Cited

U.S. PATENT DOCUMENTS

| | | |
|---|---|---|
| D735,739 S | 8/2015 | Choi et al. |
| D761,814 S | 7/2016 | Everette et al. |
| D772,917 S | 11/2016 | Edman |
| D794,664 S | 8/2017 | Okabe et al. |
| D798,894 S | 10/2017 | Ibsies |
| D809,001 S | 1/2018 | Funnell et al. |
| 9,873,509 B2 * | 1/2018 | Gagnon ................ A62B 99/00 |
| D824,414 S | 7/2018 | Peeters et al. |
| D826,964 S | 8/2018 | Edman |
| D831,676 S | 10/2018 | Park et al. |
| D845,965 S | 4/2019 | Kim et al. |
| D854,574 S | 7/2019 | Coffman et al. |
| D861,014 S | 9/2019 | Connor et al. |
| D875,127 S | 2/2020 | Wong |
| D890,793 S | 7/2020 | Loper et al. |
| D895,641 S | 9/2020 | Gansca et al. |
| D898,049 S | 10/2020 | Protzman et al. |
| D901,533 S | 11/2020 | Coffman et al. |
| D918,934 S | 5/2021 | Anderson et al. |
| D928,185 S | 8/2021 | Dye et al. |
| D946,595 S | 3/2022 | Ohayon |
| D952,652 S | 5/2022 | Gansca et al. |
| D963,663 S | 9/2022 | Cohen et al. |
| 2013/0226452 A1 * | 8/2013 | Watts ................ G01C 21/3407 701/528 |

OTHER PUBLICATIONS

Extended European Search Report issued May 25, 2023 for European Patent Application No. 22214694.6, 9 pages.

Kalabokas Pavlos et al: "A study of the influence of tropospheric subsidence on spring and summer surface ozone concentrations at the JRC-Ispra station in northern Italy", May 16, 2019 (May 16, 2019), pp. 1-40, XP093046536, DOI: 10.5194/acp-2019-438 [retrieved on May 12, 2023].

* cited by examiner

| Temperature (°C) | Color |
|---|---|
| -70°C | White |
| -50°C | Magenta |
| -30°C | Purple |
| -10°C | Indigo |
| -5°C | Blue |
| 0°C | Turquoise |
| 5°C | Teal |
| 10°C | Green |
| 15°C | Yellow |
| 20°C | Orange |
| 30°C | Red |
| 40°C | Maroon |

| Speed (knots) | Color |
|---|---|
| 0 kts | Magenta |
| 10 kts | Purple |
| 20 kts | Violet |
| 25 kts | Indigo |
| 35 kts | Blue |
| 40 kts | Turquoise |
| 50 kts | Green |
| 70 kts | Yellow |
| 100 kts | Orange |
| 200 kts | Red |

SYSTEM AND METHOD FOR DYNAMIC DISPLAY OF LEGEND

TECHNICAL FIELD

The present disclosure generally relates to presentment of a legend for explaining displayed information and more specifically to a system, method, and graphical user interface for dynamically adjusting the legend as the displayed information changes.

BACKGROUND

Weather information plays a vital role in the planning and execution of flight operations. Initially, the trajectory for a flight plan may be selected based on forecasted weather conditions for various waypoints along the route. When actual weather conditions along the route differ from the forecasted conditions, the flight trajectory may need to be re-calculated en route, thus resulting in various inefficiencies, such as, for example, delay in flight time and increased fuel consumption and emissions.

The weather information used for flight planning and operations may include aviation-specific weather information, such as, e.g., ceiling, visibility, density altitude, altimeter, and turbulence, as well as general weather information, such as, e.g., temperature, precipitation, pressure, humidity, wind speed, wind temperature, and wind direction. Existing flight planning tools receive weather information from various sources, including, for example, observational products, such as ground-based radar (e.g., NEXRAD), satellite imagery, pilot weather reports (e.g., "PIREPs"), and meteorological aerodrome reports ("METARs"), and forecasting products, such as prog charts, terminal aerodrome forecasts ("TAFs"), Model Output Statistics ("MOS"), and the area forecast ("FA") and AIRMET Sierra bulletin.

Some weather information is specific to not only the exact location and time, but also an altitude of that location, or the height above surface level. For example, wind speed and wind temperature values for a specific location and time may vary significantly as the altitude changes, sometimes swinging from one extreme to the other. Thus, accurate representation of such information can be essential for flight planning purposes.

One flight planning tool provides a graphical user interface ("GUI") configured to present wind speed and wind temperature information in a color-coded manner, i.e. using different colors to represent different values, along with a corresponding legend for explaining the color code. The legend displayed by this GUI is a static graphical element designed to cover the entire range of possible values for any altitude and/or any location (e.g., a wind temperature range of −100 degrees Fahrenheit (° F.) to 100° F.). Normally, a legend with such a wide range of values must be extremely detailed and/or extremely large so that the user can accurately discern its details, or identify the value represented by each color. However, neither of these options are available when the overall size of the legend (e.g., length and/or width) is reduced to fit the display screen of a mobile device (e.g., a smartphone, tablet, etc.) or laptop computer. As a result, existing legends generally define only a select group of colors from the color code, which can create uncertainty or confusion as to the exact values or information being displayed on the GUI.

Accordingly, there is still a need in the art for a weather forecasting tool for planning flight operations that is capable of providing precise legend information for a wide range of values.

SUMMARY

The invention is intended to solve the above-noted problems by providing systems and methods that are designed, among other things, to dynamically adjust a color-coded legend based on information retrieved in response to receiving a user input, the adjustment including at least one of altering the values represented by the color-coded legend based on a range of values included in the retrieved information, altering the colors shown in the color-coded legend to correspond with the represented values, and adjusting a specificity of the color-coded legend based on the number of represented values and a size of the display screen.

One example embodiment provides a computer-implemented method for dynamically adjusting a legend of a graphical user interface using an electronic device comprising one or more processors, a user input device, and a display unit, the method comprising: receiving, via the user input device, a first input indicating a first altitude value; retrieving, via the one or more processors, weather information corresponding to the first input; generating, using the one or more processors, a command signal for displaying a legend having a color-code or shading-code associated with a plurality of attributes included in the retrieved weather information; and displaying the legend, on the display unit, in association with the retrieved weather information.

Another example embodiment provides a non-transitory computer readable storage medium storing one or more programs, the one or more programs comprising instructions which, when executed by an electronic device with a display unit, cause the electronic device to: receive, via the user input device, a first input indicating a first altitude value; retrieve weather information corresponding to the first input; generate a command signal for displaying a legend having a color-code or shading-code associated with a plurality of attributes included in the retrieved weather information; and display the legend, on the display unit, in association with the retrieved weather information.

Yet another example embodiment provides a system comprising a display unit; a user input device configured to receive a first input indicating a first altitude value; one or more processors; and memory configured to store one or more programs, the one or more programs being configured for execution by the one or more processors and including instructions for: retrieving weather information corresponding to the first input; generating a command signal for displaying a legend having a color-code or shading-code associated with a plurality of attributes included in the retrieved weather information; and displaying the legend, on the display unit, in association with the retrieved weather information.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 4A shows an exemplary color code for wind temperature, in accordance with embodiments.

FIG. 4B shows an exemplary color code for wind speed, in accordance with embodiments.

DETAILED DESCRIPTION OF EXAMPLE EMBODIMENTS

Figure 2:
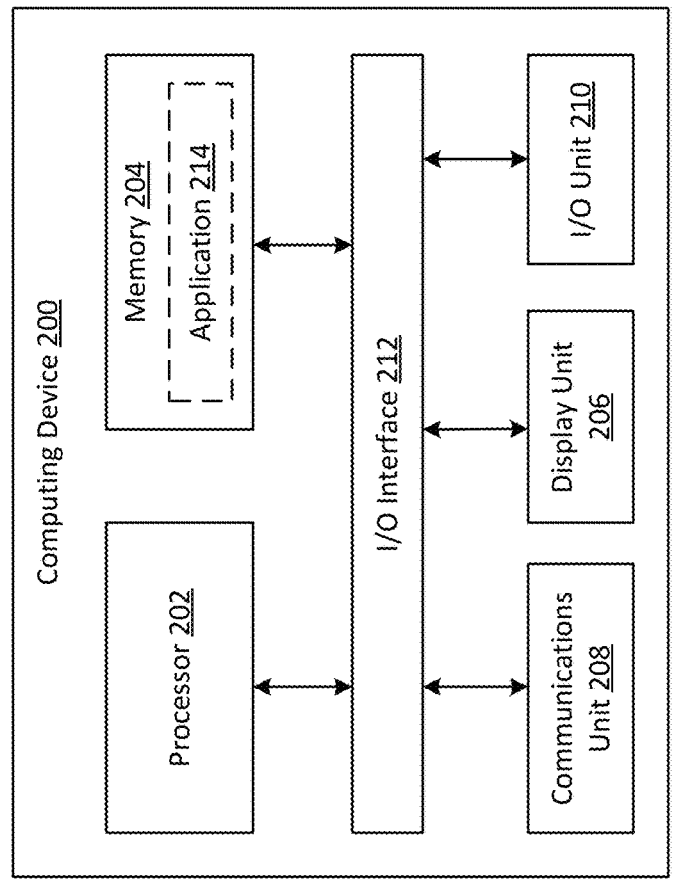
FIG. 2 is a block diagram of an exemplary computing device capable of implementing aspects of the embodiments described herein.

The description that follows describes, illustrates, and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Existing graphical user interfaces provide a weather map with a single static, "one-size-fits-all" legend that is designed to cover the entire range of possible values (e.g., 40° C. to −70° C.) for any altitude and/or any location. In doing so, the existing legends fail to provide the specificity necessary to easily discern, for example, a wind temperature value of −50° C. from a value of −40° C., or a wind speed value of 90 kts from a value of 100 kts, when looking at the weather map.

Systems and methods are provided herein for dynamically adjusting a color-coded legend based on information retrieved in response to receiving a user input, wherein the retrieved information includes a plurality of attributes, the legend includes a plurality of colors for representing a range of values, and the adjustments include one or more of the following: (a) altering the range of values represented by the color-coded legend based on the attributes included in the retrieved information, (b) changing the plurality of colors included in the color-coded legend based on the represented values, and (c) adjusting a specificity of the color-coded legend based on the number of represented values. The color-coded legend may be included in, or presented on, a user interface, such as a graphical user interface ("GUI"), that may be included in a flight planning software product, such as, e.g., ForeFlight, or other software running on the electronic device. The user interface may be configured to present map information, weather information, and/or flight planning information in multiple layers or regions. The user interface may be further configured to use color-coding, shading, graphical icons, animation, and/or other graphics to symbolize select weather conditions, including wind direction, wind speed, wind temperature, and other weather information. The user interface may also include interactive or user-controllable components (e.g., scrollable features, selectable elements, movable graphics, etc.) to enable user selection of one or more configurable aspects, such as altitude, time (e.g., date, hour, etc.), geographical location, map layer, map type, etc. These and another features of the color-coded legend, the user interface, and the systems and methods for implementing the same are described herein in more detail.

While the following description and accompanying drawings specifically refer to a legend for representing wind speed information or wind temperature information, it should be understood that the techniques described herein may be used to provide a legend that represents or explains any type of information, including other types of weather information and/or non-weather related information.

As used herein, "weather information" pertains to any information related to weather, and in some cases, related environmental conditions. The weather information may be geo-spatially labeled, or associated with a specific geographic location or region. In embodiments, the weather information may be for a particular airport, city or town, landmark, waypoint, set of longitude and latitude coordinates, or the like. In addition, the weather information may be time-encoded, or pertain to weather conditions at a specific point-in-time or time period. In embodiments, the weather information may comprise one or more of current or observed weather information, forecast or predicted weather information, and previous or recorded weather information.

In terms of content, the weather information may comprise aviation-specific weather information including, for example, flight category information, visibility information, cloud ceiling information, density altitude information, altimeter information, turbulence information, icing information, volcanic ash information, lightning information, and any other weather-related information that is specifically relevant to forecasting for flight operations and other in-air situations. The weather information may also comprise general weather information including, for example, temperature information, precipitation information, dew point and humidity information, barometric pressure information, wind information (including wind speed, wind temperature, and wind direction), and any other weather-related information that is used for everyday forecasting on the ground or otherwise.

The weather information may be received from sources situated in the air, such as satellites, aircraft reports, and the like, for example. The weather information may also, or alternatively, be received from sources situated on the ground, such as airports, ground stations, or other local weather sources; a central reporting service or other forecasting service covering multiple locations (e.g., the Aviation Digital Data Service ("ADDS") operated by the National Oceanic and Atmospheric Administration ("NOAA")); a datastore for storing or archiving weather information; and the like, for example. Exemplary weather sources may include, but are not limited to, ground-based radar (e.g., NEXRAD), satellite imagery, pilot weather reports (e.g., "PIREPs"), meteorological aerodrome reports ("METARs"), prog charts, terminal aerodrome forecasts ("TAFs"), Model Output Statistics ("MOS"), significant meteorological information ("SIGMET"), and the area forecast ("FA") and AIRMET Sierra bulletin.

In various embodiments, certain weather information, such as, e.g., wind speed and/or wind temperature information, may be presented on a graphical user interface using color-coding to indicate a severity of the corresponding weather condition. For example, the color-coding scheme or technique may be used to assign a certain color (e.g., white, magenta, purple, blue, green, yellow, orange, red, etc.) to a certain weather condition or element (e.g., a specific wind temperature value, a specific wind speed value, etc.) (e.g., as shown in FIGS. 4A and 4B). In some embodiments, the color-coding scheme may be at least partially based on rules and regulations established by a governing entity, such as, e.g., the Federal Aviation Administration ("FAA") or the like. Alternatively, the color-coding scheme may be proprietary or any other classification for assigning a particular color to a particular weather value or attribute, and may use other or additional colors not shown (e.g., pink, black, etc.) to signify the various conditions. For example, the color-coding scheme, or color-code, shown in FIGS. 4A and 4B may include additional colors that are different shades, or blends, of the colors shown in adjacent rows to represent attributes or values that correspondingly fall between the adjacent rows. In other embodiments, the graphical user interface may be configured to use shading, styling, or other graphical schemes, in addition to or instead of color-coding, to signify the weather conditions.

Figure 1:
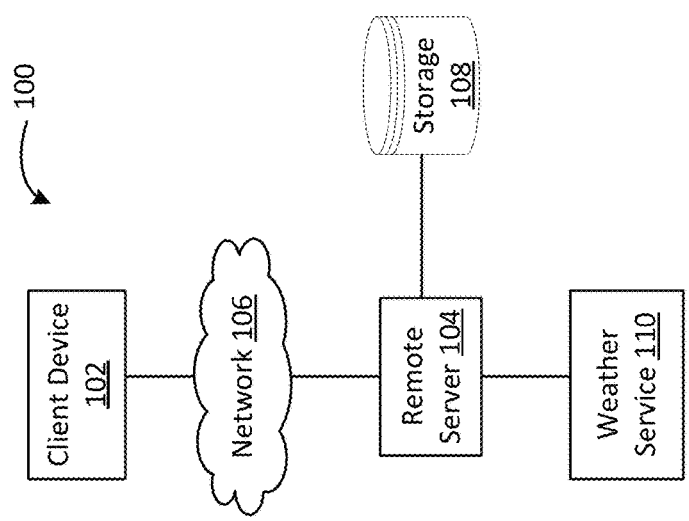
FIG. 1 is a block diagram of an exemplary networked system capable of implementing aspects of the embodiments described herein.

Referring now to FIGS. 1 and 2, shown are exemplary computing environments in which the various embodiments described herein may be implemented. It should be appreciated that FIGS. 1 and 2 are only exemplary and therefore, may be modified as needed, and are not intended to assert or imply any limitation with respect to the environments in which different embodiments may be implemented. In addition, FIGS. 1 and 2 may include other components than what is shown, or fewer components, as will be appreciated.

FIG. 1 illustrates an exemplary networked system 100 for carrying out one or more of the embodiments described herein. The system 100 comprises a plurality of computers or computing devices, including client device 102 and remote server 104, and a communication network 106 for facilitating communication between the computers to form the networked system 100. Communication between the components of the system 100, including the computers and the network 106, may be carried out using wired connections, wireless communications, or both.

In embodiments, the communication network 106 may be the Internet or other global computer network. Each of the client device 102 and the remote server 102 may be configured to use the Internet protocol suite (TCP/IP) to communicate over the network 106. In some embodiments, the communication network 106 may include a number of different types of networks, such as, for example, cellular networks, satellite, an intranet, a wide area network ("WAN"), a local area network ("LAN"), personal area networks (e.g., Bluetooth, near field communication, infrared, etc.), or the like, in addition to or instead of the Internet.

According to embodiments, the client device 102 can be configured to generate, display, or otherwise provide a user interface for presenting map information, weather information, and/or flight planning information to a user, along with a color-coded legend corresponding to one or more pieces of displayed information, in accordance with the techniques described herein. The user interface may be a graphical user interface ("GUI") or the like, and the color-coded legend may include a scale comprising a plurality of values and a plurality of colored sections correspondingly arranged adjacent the displayed values. Exemplary graphical user interfaces include, but are not limited to, user interface 500 shown in FIG. 5A, user interface 900 shown in FIG. 9A, and user interface 1200 shown in FIG. 12, while exemplary color-coded legends include, but are not limited to, legend 550 shown in FIG. 5B, legend 950 shown in FIG. 9B, and legend 1250 shown in FIG. 12. The user interface may be integrated into, or form part of, a flight planning software application, which may be executing on one or more of the client device 102 and the remote server 104. The client device 102 can be further configured to communicate with the remote server 104 via the network 106 to implement all or aspects of the user interface and/or the flight planning software application. For example, weather information, including wind speed and wind temperature, may be received from the remote server 104 at the client device 102 for presentation thereon.

The client device 102 (also referred to herein as "electronic device") may be any type of computing device capable of displaying the graphical user interface and interfacing with the network 106 and/or the remote server 104, including, for example, a mobile communication device (e.g., a smart phone or portable telephone) or any other type of mobile computing device (e.g., a tablet or PDA), and a personal computer (e.g., laptop or desktop). In a preferred embodiment, the electronic device 102 includes a display screen (e.g., display screen 206 shown in FIG. 2) for displaying the graphical user interface and one or more input devices (e.g., I/O devices 210 shown in FIG. 2) for receiving inputs from a user of the electronic device 102 in association with the graphical user interface.

The remote server 104 can be configured to retrieve, access, or obtain the weather information and any other information that is used to generate the user interface and corresponding color-coded legend. In some cases, the remote server 104 may provide said information directly to the client device 102. In other cases, the remoter server 104 may first process the received information and generate all or aspects of the graphical user interface based thereon before sending the GUI to the client device 102. The remote server 104 may be any suitable computer or computing device configured as one or more of a database server, a file server, a web server, a cache server, and an application server, for example. In embodiments, the remote server 104 may be operated by, or affiliated with, an entity that hosts or offers the flight planning software application, or other software application capable of providing or generating the graphical user interface for the client device 102.

As shown, the remote server 104 may be connected to, or in communication with, a data storage device 108 and a weather service component 110 for storing and/or obtaining weather information. The data storage device 108 may be any type of database, datastore, storage unit, or other electronic device capable of storing, archiving, or caching the weather information and/or other types of information received from the remote server 104. The weather service component 110 may be configured to access or receive weather information or data from multiple sources, and process the weather information to provide weather conditions for a specific geospatial location, altitude, and time. In embodiments, the system 100 may receive current, forecast, or updated weather information from the weather service component 110 and store all received weather information in the data storage device 108 in a cache memory or other memory of the device 108. In some embodiments, the stored weather information may be retrieved from the data storage device 108 and used by the remote server 104 for generation of the graphical user interface, and included weather legend, when new weather information cannot be obtained from the weather service component 110, such as, for example, during off-line operation. The weather service component 110 may be implemented using one or more servers, computers, databases, or any combination thereof. In some embodiments, the weather service component 110 may be in communication with a third-party service, such as Weather Services International ("WSI") or the like.

Each of the remote server 104, the data storage device 108, and the weather service component 110 may reside in a common location, or at various locations that are connected together by the network 106, a local area network ("LAN"), or other network connection to form a distributed network. In some cases, the data storage device 108 and/or the weather service component 110 may be stored in a memory of the remote server 104. In other cases, the weather service component 110 may be stored in a separate location from the remote server 104 and operated by a third party service (e.g., WSI, etc.). In such cases, the weather service component 110 may use the network 106 to communicate with the remote server 104.

In some embodiments, the system 100 may include software or computer program(s) (not shown) executing on multiple processors to enable interactions between various components of the system 100. For example, such programs may include a web service (e.g., a Simple Object Access Protocol ("SOAP") web service) or the like executing on the remote server 104 for interacting with the client device 102, a mobile application, web application, or the like executing on the client device 102 for interacting with the web service and/or the remote device 104, a web service or the like executing on the data storage device 108 for interacting with the remote server 104, a web service or the like executing on the remote server 104 for interacting with the weather service component 110, and/or other suitable software-based interfaces.

FIG. 2 illustrates a simplified block diagram of an exemplary computing device 200, in accordance with embodiments. One or more computing devices like computing device 200 may be included in the system 100 to implement the client device 102, the remote server 104, and/or other component(s) of the system 100. The computing device 200 can be configured to perform a variety of functions or acts, such as those described in this disclosure (and shown in the accompanying drawings), including generating, displaying, or otherwise providing the weather forecast user interface to the user, using the techniques provided herein.

The computing device 200 can include various components, including for example, one or more processors 202, memory 204, display screen 206, communications unit 208, and input/output (I/O) unit 210, all communicatively coupled by an I/O interface 212, which may include a system bus, network, or other connection mechanism. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, one or more features of the computing device 200 may be physically remote and may be communicatively coupled to the computing device 200, via the communications unit 208, for example.

Processor 202 can be configured to execute software instructions stored in memory 204 and control operation of the computing device 200. Processor 202 may include a general purpose processor (e.g., data processor) and/or a special purpose processor (e.g., graphics processor or digital signal processor (DSP)). Processor 202 may be any suitable processing device or set of processing devices for processing, inputting, outputting, manipulating, storing, or retrieving data, such as, but not limited to, a central processing unit, a microprocessor, a microcontroller-based platform, an integrated circuit, one or more field programmable gate arrays (FPGAs), and/or one or more application-specific integrated circuits (ASICs).

Memory 204 may be any type of hardware that is capable of storing information on a temporary or permanent basis. Memory 204 may include one or more of a data storage device, an electronic memory, a nonvolatile random access memory (e.g., RAM), flip-flops, a non-transitory computer-writable or computer-readable storage medium or media, a magnetic or optical data storage device, or other electronic device for storing, retrieving, reading, or writing data. In some cases, memory 204 includes multiple kinds of memory, particularly volatile memory and non-volatile memory.

Memory 204 can store one or more computer program modules, computer executable instructions, or other software, such as, e.g., one or more software applications 214 shown in FIG. 2, for execution by processor 202. In embodiments, memory 204 is configured to store one or more sets of instructions or software that, when executed by processor 202, cause the processor 202 to implement one or more techniques of the present disclosure. For example, the instructions may embody one or more of the methods or other operations described herein for providing a graphical user interface ("GUI") with dynamic legend and/or dynamically adjusting a color-coded legend based on information displayed on and/or inputs received via the GUI (such as, e.g., method 1400 shown in FIG. 14). In some cases, the instructions may reside completely, or at least partially, within any one or more of memory 204, separate computer readable medium, and/or within the processor 202 during execution of the instructions.

Figure 3:
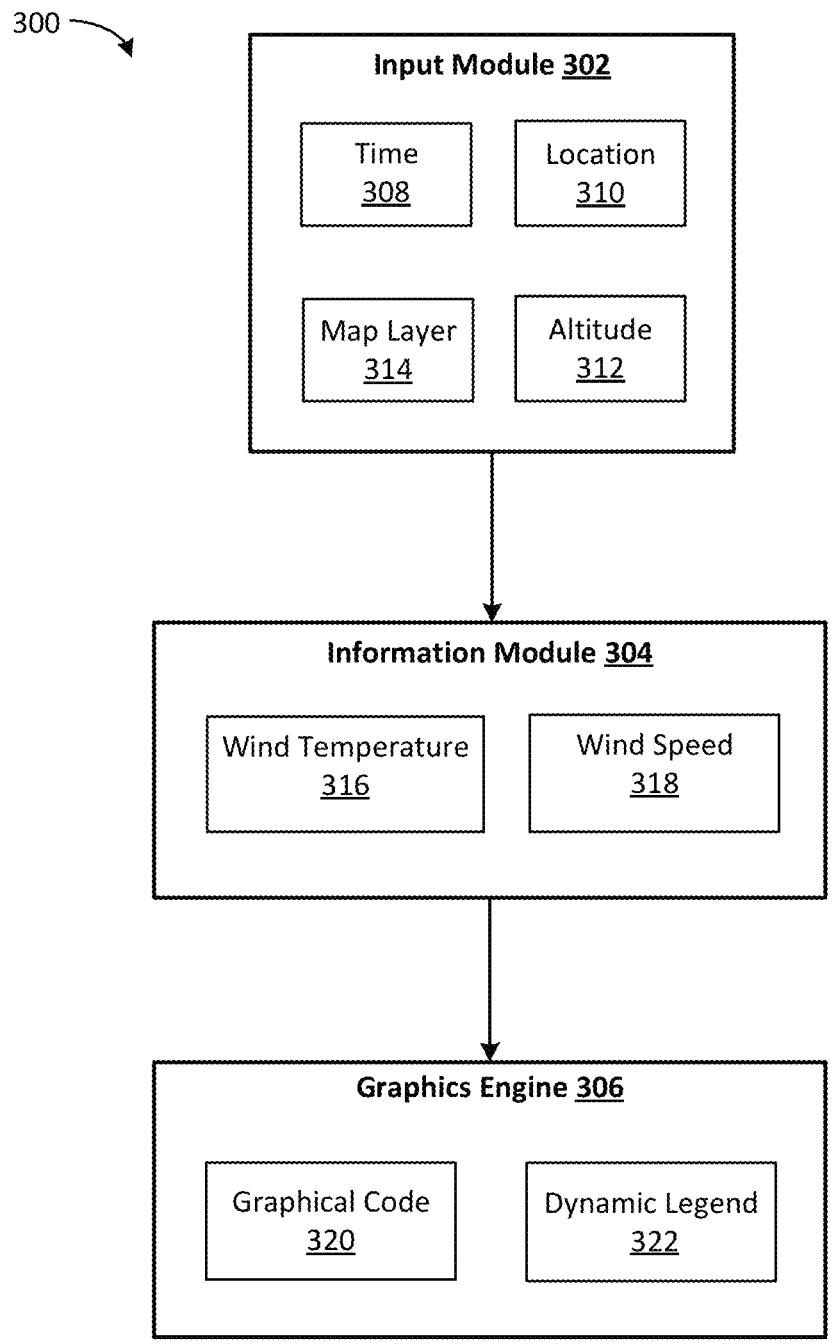
FIG. 3 is a block diagram of an exemplary dynamic weather legend system in accordance with embodiments.
Figure 14:
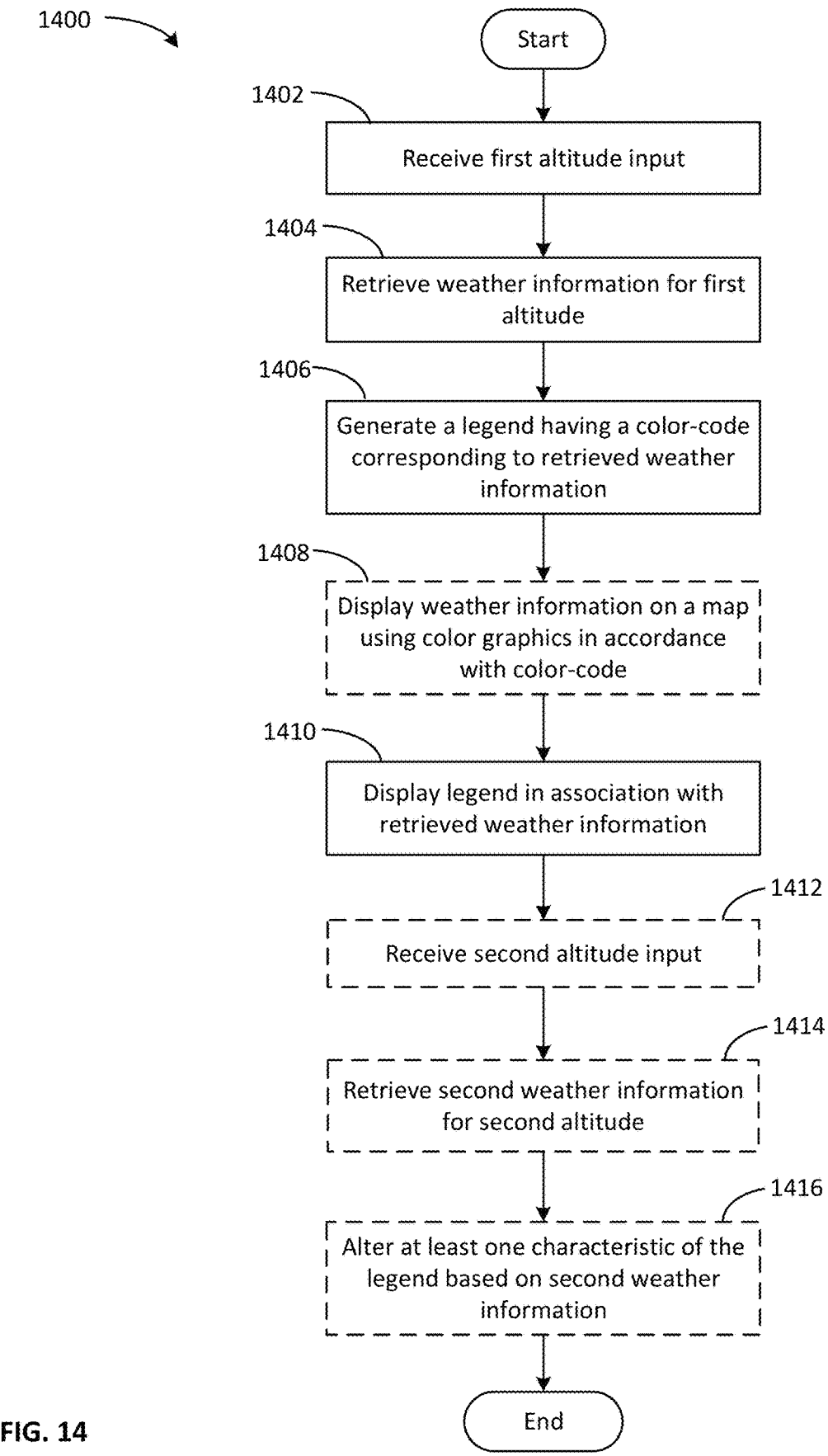
FIG. 14 is a flow diagram of an exemplary method for dynamically adjusting a color-coded legend, in accordance with embodiments.

In embodiments, the one or more software applications 214 may include a dynamic legend application configured to implement the methods or operations described herein, such as, for example, as described with respect to system 300 of FIG. 3 and/or method 1400 of FIG. 14. In some embodiments, the dynamic legend application may reside on multiple devices, such as, e.g., the client device 102 and/or the remote server 104 of FIG. 1. The one or more software applications 214 may also include one or more software interfaces or computer programs tailored to interact and exchange data with one or more components of the system 100, or with the dynamic legend application, such as, e.g., a mobile application that can be executed on a smart phone, tablet, or other mobile device, or a web application that can be executed on a desktop computer or laptop.

Communications unit 208 allows the computing device 200 to communicate with one or more devices (or systems) according to one or more protocols. For example, communications unit 208 may comprise one or more radio transceivers configured for communicating with a cellular network, a wireless local area network, a wide area network, a Bluetooth® network, and/or other personal area networks (e.g., RFID, NFC, etc.). Though not shown, communications unit 208 may further include antennas, modems, and other wireless communication circuitry for carrying out wireless communications.

Display unit 206 can be configured to display a visual output on the computing device 200. The visual output may include, for example, the dynamic legend described herein, the graphical user interfaces described herein, and/or other information (e.g., text, icons, objects, video, or any combination thereof). Display unit 206 may include LCD (liquid crystal display) technology, LPD (light emitting polymer display) technology, LED (light emitting diode) technology, or other display technologies. Display unit 206 may be integrated into the computing device 200 or functionally coupled to the device 200 using a wired or wireless connection, as will be appreciated.

I/O unit 210 can be configured to facilitate interaction between a user and the computing device 200, as well as allow for input and output of data with other devices connected to the computing device 200. I/O unit 210 may include input components, such as, for example, a keyboard, a keypad, a mouse, a microphone, and a video capture device or camera, and output components, such as, for example, a haptic feedback system and an audio output system or speaker. Some components of the I/O unit 210 may be internal to, or included in, the computing device 200, while others may be externally located and connected to the computing device 200 using a wireless connection or a wired connection (e.g., Universal Serial Bus ("USB") cable or the like). In some cases, the I/O unit 210 further include a data port (such as, e.g., a USB port, a mini-USB port, a Lightening connector port, etc.) for receiving data from and/or transmitting data to an external data source or other device coupled to the data port.

In some embodiments, the I/O unit 210 further includes a touch sensitive surface disposed over, or on top of, at least a portion of the display screen 206 to collectively form a touchscreen, or touch-sensitive display system. In such cases, the display screen 206 may operate as an output interface between the user and the computing device 200, while the touch-sensitive surface may operate as an input interface between the user and the computing device 200. For example, the touchscreen can be configured to detect contact or touch input on the touch-sensitive surface, or a movement or breaking thereof, and convert the detected contact into a visually-presented interaction with user-interactive graphics displayed on the display screen 206, for example, as part of the graphical user interface.

FIG. 3 illustrates an exemplary dynamic weather legend system 300 configured to dynamically adjust a color-coded legend based on received information, such as weather information and/or a user input, and graphically present the legend, in association with the weather information, on a display unit of an electronic device, in accordance with embodiments. In embodiments, the system 300 can be configured to generate, retrieve, display, or otherwise provide a graphical user interface ("GUI") for presenting the dynamic weather legend and associated weather information to the user. The system 300 may be implemented using a computing device, such as computing device 200 of FIG. 2, and/or a networked system of computing devices, such as system 100 of FIG. 1. In addition, various components of the dynamic weather legend system 300 may be implemented using software executable by a processor (e.g., processor 202) of one or more servers or computers and stored in a memory (e.g., memory 204) thereof, such as the dynamic legend application. The system 300 may also be implemented through interactions between various components of the system 100 that are facilitated by software executing on multiple processors of said components, such as, e.g., one or more web services, a mobile application, a web application, etc.

Referring back to FIG. 3, the system 300 comprises an input module 302 configured to receive user inputs or other information for indicating a select time, location, altitude, and/or map layer. The system 300 also comprises an information module 304 configured to obtain weather information for the select time, location, altitude, and/or map layer, and a graphics engine 306 configured to generate a dynamic weather legend based on the obtained weather information. In some embodiments, the graphics engine 306 also generates a user interface (e.g., GUI) capable of graphically presenting the dynamic weather legend, as well as the select map layer and the weather information obtained for the select time, location, altitude, and/or map layer, in accordance with embodiments. The modules 302 and 304 and the engine 306 may be implemented in hardware, software, or a combination of both. In various embodiments, each of the components 302, 304, and 306, in whole or in part, may be implemented as computer software (e.g., software modules, engines, databases, tables, and/or other components) stored in memory and operating on one or more processors associated with the system 100. In some embodiments, input module 302 and/or graphics engine 306 may be configured, using computer software instructions stored in a memory and executing on a processor of the client device 102, to carry out certain portions of the methods and operations described herein. Similarly, information module 304 may be configured, using computer software instructions stored in a memory and executing on a processor of the remote server 104, to carry out certain other portions of the method and operations described herein. In other embodiments, the graphics engine 306 and/or information module 304 may be carried out, in relevant part, by each of the client device 102 and the remote server 104. Other combinations or configurations for the depicted components of the system 300 are also contemplated and considered part of the present disclosure.

As shown, the input module 302 can be configured to receive one or more inputs, such as, but not limited to, a time input 308, a location input 310, an altitude input 312, and a map layer input 314, and provide the received input(s), or data associated therewith, to the information module 304. The information module 304 can be configured to request or retrieve weather information corresponding to the location, altitude, time period, and/or map layer indicated by the input(s). The inputs 308, 310, 312, and 314 may be received via one or more user interfaces provided by the system 100 and/or the system 300. For example, the inputs 308, 310, 312, and/or 314 may be associated with, or the result of, a user selection made using a flight planning user interface, a weather forecast user interface, or other graphical user interface (e.g., graphical user interface 500 shown in FIG. 5A). In some embodiments, the inputs 308, 310, 312, and/or 314 may be provided using a verbal or vocal command.

Figure 5A:
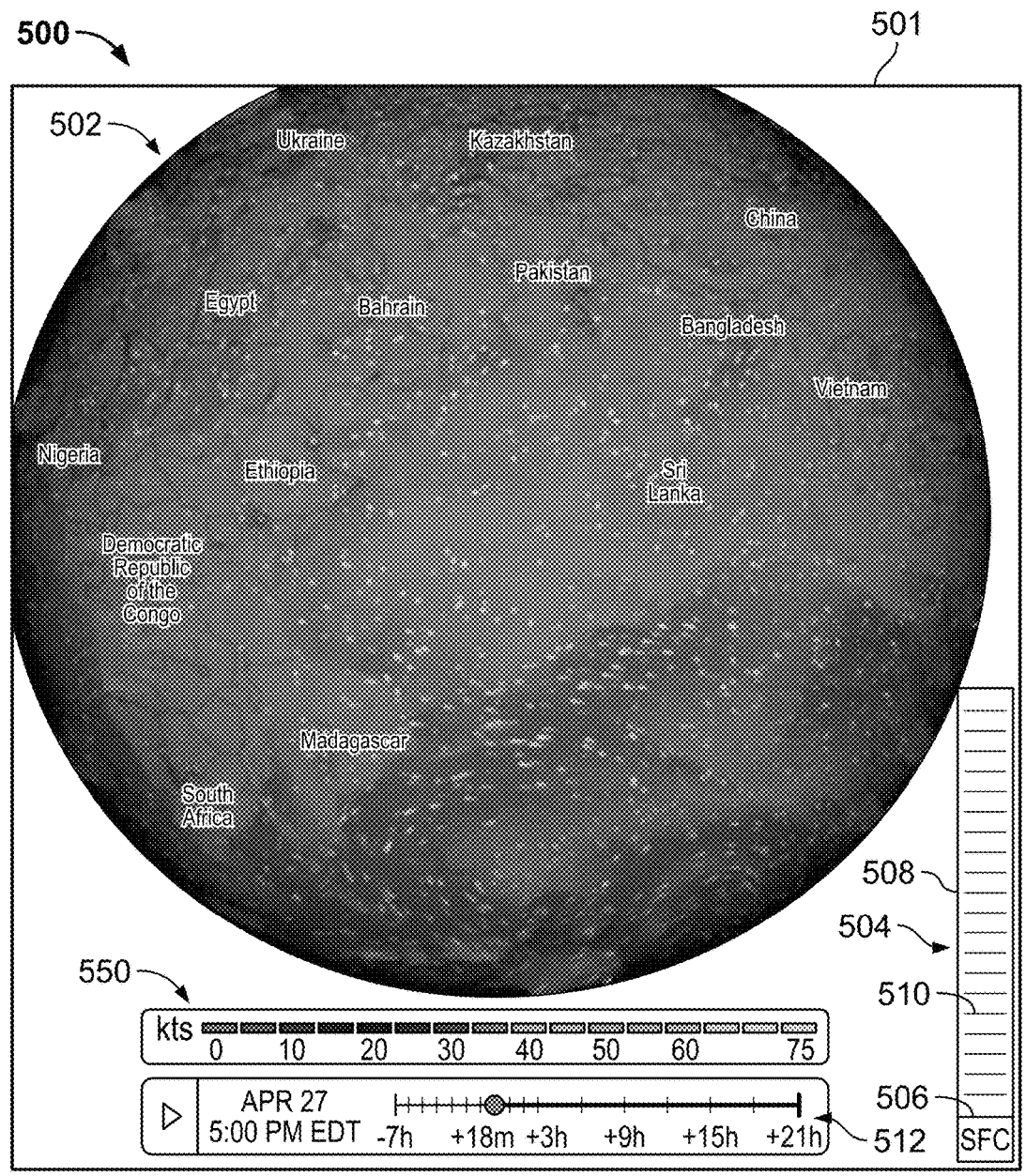
FIG. 5A is a screenshot of an exemplary graphical user interface for depicting wind speeds at surface level and a corresponding color-coded legend, in accordance with embodiments.
Figure 6A:
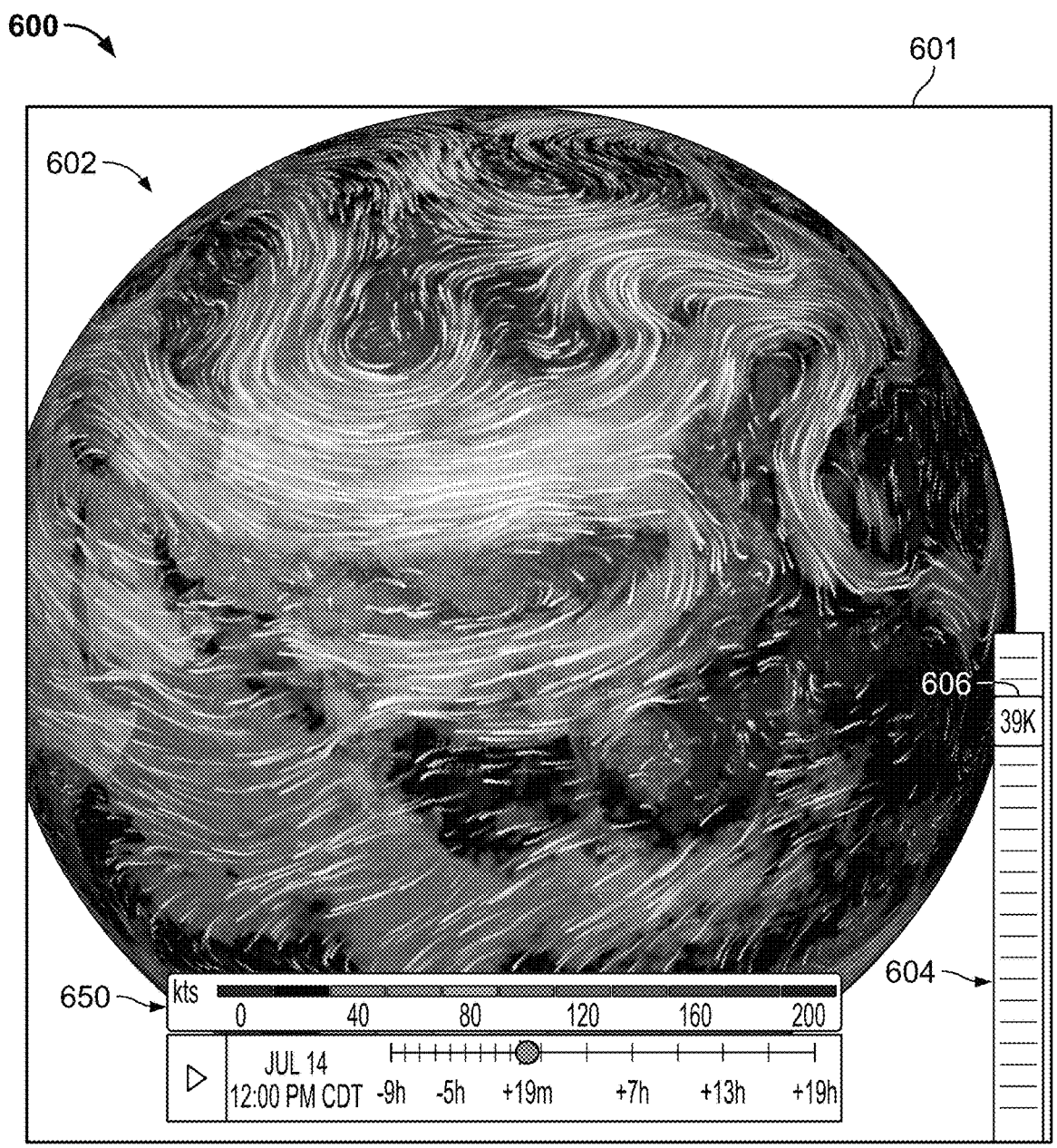
FIG. 6A is a screenshot of an exemplary graphical user interface for depicting wind speeds at 39,000 feet above sea level and a corresponding color-coded legend, in accordance with embodiments.

The time input 308 includes or indicates a select time, or point-in-time, that is used by the information module 304 to define the temporal boundaries of the weather information being retrieved by the information module 304 for presentation on the graphical user interface. The time input 308 may include date information (e.g., day, month, year, and/or other calendar information) and time information (e.g., hour, minute, second, and/or other temporal information) corresponding to the desired point-in-time. Said point-in-time may be a current point-in-time, a future point-in-time, or a past point-in-time. In some embodiments, the time input 308 can be set to the current point-in-time as a default setting. In such cases, the information module 304 may retrieve weather information corresponding to the time at which the request was received (or submitted). In other embodiments, the graphical user interface may be configured to enable user selection or entry of a future or past point-in-time, for example, using a calendar function that displays user-selectable options for selecting a given date and time on a calendar, a timeline function that displays a timeline scale with a slidable marker or other movable input option for selecting a given date and time on the scale (e.g., as shown in FIGS. 5A and 6A), or any other suitable user interface. In such cases, the information module 304 may retrieve weather information corresponding to the point-in-time indicated by the time input 308.

The location input 310 includes or indicates a select geographic location that is used by the information module 304 to define the geo-spatial boundaries of the weather information being retrieved for presentation on the graphical user interface. As an example, the location input 310 may include any type of geographical information, or other indication of a location, such as, but not limited to, a set of geographic coordinates (e.g., longitude and latitude), name or other identification of a waypoint, airport (or an airport code associated therewith), city, or other landmark, or specific address information.

Figure 7A:
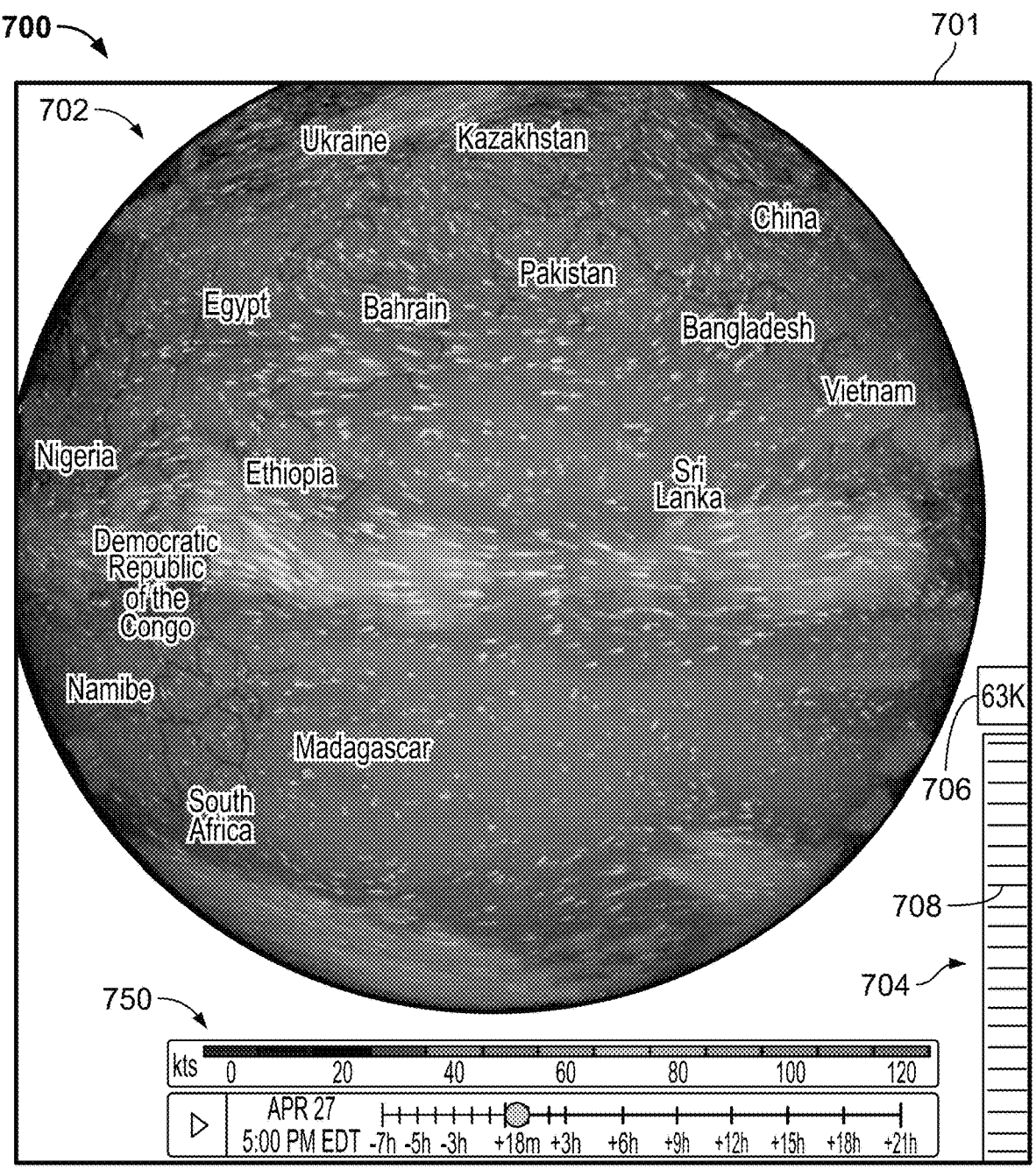
FIG. 7A is a screenshot of an exemplary graphical user interface for depicting wind speeds at 63,000 feet above sea level and a corresponding color-coded legend, in accordance with embodiments.

In embodiments, the location input 310 may be entered using a graphical user interface configured to display a geographical map and enable user selection of any location, or plurality of locations, on the map (e.g., as shown in FIGS. 5A and 7A). User selection of the geographic location(s) may be entered or indicated using a tap, double-tap, long press, drag, or other touch-based gesture; a click, scroll, highlight, or other maneuvering of a computer mouse or the like; or any other type of interaction with the graphical user interface at or near a desired area on the map. In other embodiments, the location input 310 may be entered using a graphical user interface that is configured to display a list of geographic locations by name, such as, for example, airports, waypoints, cities, or other landmarks, and enable user selection of any location named in the list. In such cases, the location input 310 may include the name or other identification of a location selected from the list. In any case, the graphics engine 306 can be configured to display the geographical map, or other interface, that enables user selection of the location input 310.

The graphics engine 306 can also be configured to display the user-selected geographical location on a map (either the same geographical map or a different one) and present the weather information on the map in association with at least the user-selected geographical location. The map may depict one or more geographical locations depending on the location input 310 received at the input module 302. For example, the location input 310 may indicate or identify user selection of one or more hemispheres, regions, continents, countries, states, counties, cities, or other geographical location, and the selected location(s) may be provided to the graphics engine 306 to generate a map that includes or shows those location(s), for example, as shown in FIG. 5. The location input 310 and/or the selected geographical location(s) may also be provided to the information module 304 to retrieve weather information for each of the selected locations. The weather information may include one or more values, or attributes, for describing a current status or state of a particular weather condition at each selected location. The weather information may be provided to the graphics engine 306 for presentation on the map at, or adjacent to, the corresponding locations.

As will be appreciated, certain weather conditions can be dependent on the altitude at which the measurement is taken. For example, for a given time and location, the weather information measured at a first altitude value (e.g., at surface or ground level) may differ from the weather information measured at a second, significantly different altitude value (e.g., at 39,000 feet). Accordingly, the input module 302 can be configured to receive an altitude input 312 that includes, or indicates, a select altitude value, or height above surface level, for which weather information is desired by the user. The information module 304 can use the select altitude value to further define the boundaries of the weather information being retrieved for presentation on the graphical user interface. In some cases, the altitude input 312 may include an altitude, height, or other distance measurement (i.e. a numerical value) in feet, meters, kilometers, or other appropriate unit. In other cases, the altitude input 312 may include a label, category, or other text that represents or indicates the select altitude value. For example, the altitude input 312 may include "surface," or its abbreviation "SFC," to indicate a select altitude value of zero or surface level (or sea level). As another example, the altitude input 312 may include "cruising," or the like, to indicate a select altitude value of 39,000 feet or the cruising altitude of a commercial airline. The altitude input 312 may be entered using any appropriate feature of the graphical user interface.

In embodiments, the type (or category) of weather information presented on the map may be determined based on one or more inputs received via the graphical user interface. For example, the graphical user interface may be configured to provide a menu of user-selectable options (e.g., a dropdown list, a set of selectable icons, etc.) for selecting the type of weather information, or weather conditions, that are presented on the map. In some cases, the weather conditions offered for user selection specifically include the types of weather conditions that vary as the altitude varies. In other cases, other types of weather conditions may also be included on the user-selectable menu.

In the illustrated embodiment, the graphical user interface presents each type of weather condition as a separate "map layer" that overlays or places the corresponding weather information on top of, or adjacent to, the map location to which it pertains. The menu provided by the graphical user interface for selecting which weather condition to display (not shown) includes a plurality of map layers that are available for user selection. Accordingly, the map layer input 314 received at the input module 302 can include, or indicate, a select map layer, or other indication of the type of weather information desired by the user. For example, the available map layers may include, but are not limited to, a wind temperature map layer for displaying wind temperature information 316 for each geographical location on the map (e.g., as shown in FIGS. 8A, 9A, 10A, and 11A), and a wind speed map layer for displaying wind speed information 318 for each of the locations (e.g., as shown in FIGS. 5A, 6A, and 7A). In some embodiments, the map layers may include other types of map layers that are not related to weather information, in addition to the weather-related map layers.

In embodiments, the information module 304 can be configured to retrieve either the wind temperature information 316 (e.g., in Celsius or Fahrenheit) or the wind speed information 318 318 (e.g., in wind speed in knots, miles per hour, miles per second, etc.) from the remote server depending on the map layer input 314 received from the input module 302. The information module 304 can provide the received weather information 316 or 318 to the graphics engine 306. In other embodiments, the information module 304 can be configured to retrieve both types of weather information 316 and 318, but provide only the user-selected weather condition to the graphics engine 306, i.e. the weather information that corresponds to the map layer input 314.

In some embodiments, the information module 304 may be configured to collect other types of weather information as well, such as, e.g., general weather information. The general weather information may include, for example, dew point and/or humidity information, other types of wind information (e.g., wind direction in number of degrees, etc.), other types of temperature information (e.g., high and low temperature predictions for the day, etc.), precipitation information (e.g., chance of precipitation, expected type of precipitation (e.g., rain, snow, sleet, hail, etc.), expected accumulation in number of inches and/or centimeters (if any), and the like). The general weather information may be provided to the graphics engine 306 for presentation on the weather forecast user interface.

The information module 304 can be configured to obtain the various types of weather information from a memory (or database), such as, but not limited to, a local cache or other memory of the electronic device (e.g., memory 204), a remote storage device in communication with the electronic device. (e.g., remote server 104, data storage device 108, and/or weather service 110), or any other data storage location associated with the system 100. In some embodiments, the weather or weather-related information may be pre-loaded into the memory and retrieved by the information module 304 as needed. For example, weather forecasts for a number of geographical locations (e.g., a local area, most frequented locations, etc.) and/or a predetermined period of time (e.g., 5 days in advance) may be stored in a database and continuously updated as new information becomes available. In some embodiments, the information module 304 may be configured to store received weather information in a local cache or other memory of the electronic device for up to about 60 minutes when "online" (e.g., connected to network 106 of FIG. 1), and up to about 24 hours when "offline" (e.g., disconnected from network 106). In other embodiments, the information may be requested directly from one or more weather information sources by the information module 304 in response to receiving the inputs 308, 310, 312, and/or 314 from the input module 302 and temporarily stored in the memory to enable the operations of the system 300.

The graphics engine 306 can be configured to assess or otherwise process the information received from the information module 304 and the input module 302, determine or generate appropriate graphical elements, icons, maps, and/or other graphics for representing one or more pieces of the received information in the weather forecast user interface, populate corresponding display regions, data fields, and other graphical areas of the weather forecast user interface with the graphics and received information, and otherwise provide the weather forecast user interface for display on the display unit of the electronic device, in accordance with embodiments. The graphics engine 306 may comprise a plurality of components (e.g., software modules, engines, databases, tables, or the like) to help with discrete aspects of these operations. For example, the components of the graphics engine 306 may include, but are not limited to, a graphical code block 320 for providing a graphical code that is used for graphically presenting the retrieved weather information on the weather forecast user interface, and a dynamic legend block 322 for providing a legend that defines the displayed weather information in accordance with the graphical code. In embodiments, each of these components can be configured to receive certain pieces of information from the input module 302 and/or the information module 304 and make specific determinations or selections based thereon.

More specifically, the graphics engine 306 can be configured to visually represent the retrieved weather information at corresponding locations on the map using graphics selected based on the graphical code provided by block 320. The graphical code block 320 can be configured to assign a unique color, shading (e.g., grayscale shading or filling), or other graphic (e.g., symbol, icon, image, animation, etc.) to each of a plurality of attributes included in the weather information. In the illustrated embodiments, the graphical code is a color code that assigns a unique color, or color value (e.g., hex value, RGB value, RGBA value, or the like), to each attribute (e.g., weather value or range of values). For example, FIG. 4A is a table 400 illustrating an exemplary wind temperature color code for graphically representing each of a plurality of wind temperature values (e.g., −70 degrees Celsius (° C.) to 40° C.) using a different one of a plurality of colors (e.g., white, magenta, purple, indigo, blue turquoise, teal, green, yellow, orange, red, or maroon). Similarly, FIG. 4B is a table 450 illustrating an exemplary wind speed color code for graphically representing each of a plurality of wind speed values (e.g., 0 knots (kts) to 200 kts) using a different one of a plurality of colors (e.g., magenta, purple, violet, indigo, blue, turquoise, green, yellow, orange, or red). In other embodiments, the graphical code block 320 can be configured to assign a different color value (e.g., hex values, RGB (or red green blue) values, RGBA (or red green blue alpha) values ranging from 0 to 255, inclusive, or the like) to each attribute, instead of color names or labels. In some embodiments, the graphical code block 320 can be configured to assign a given color, shading, or other graphic to a range of weather values (e.g., intervals of 5, 10, or 20). In other embodiments, the graphical code block 320 can be configured to assign a respective color, shading, or other graphic to each discrete weather value. The discrete weather values may be whole number values (e.g., 1, 2, etc.), decimal values rounded to the nearest half decimal (e.g., 0.5, 1.0, 1.5, etc.), or any other format.

In embodiments where the graphical code is a color code, the colors can be discretely defined, as shown in FIGS. 4A and 4B, or can be a spectrum of colors that includes, for example, not just the colors shown in FIGS. 4A and 4B but also, various shades thereof. For example, the spectrum may include "intermediate" colors, or shades that fall between the colors listed in adjacent rows of table 400 or 450, to represent additional weather values that correspondingly fall between the weather values listed in the adjacent rows. These additional colors may be obtained by blending the adjacent colors in varying amounts, as will be appreciated. The exact number of additional colors or shades may be selected based on the number of additional weather values that are needed and/or the numerical difference between a given pair of adjacent weather values. For example, in FIG. 4A, the wind temperature color code 400 may include a larger number of color shades between white and magenta in order to represent wind temperature values between −70° C. and −50° C., but a smaller number of color shades between turquoise and teal to represent wind temperature values between 0° C. and 5° C. Similarly, in FIG. 4B, the wind speed color code 450 may include a larger number of color shades between magenta and purple in order to present wind speed values between 0 kts and 10 kts, but a smaller number of color shades between violet and indigo to represent wind speed values between 20 kts and 25 kts.

While the embodiments described herein include weather values such as wind temperature values and wind speed values, other types of weather values or aspects may be represented on the map using similar techniques. Moreover, while certain colors are shown in the figures and described herein, it should be understood that any color or range of colors may be used in accordance with the techniques described herein.

Figures 8A, 8B:
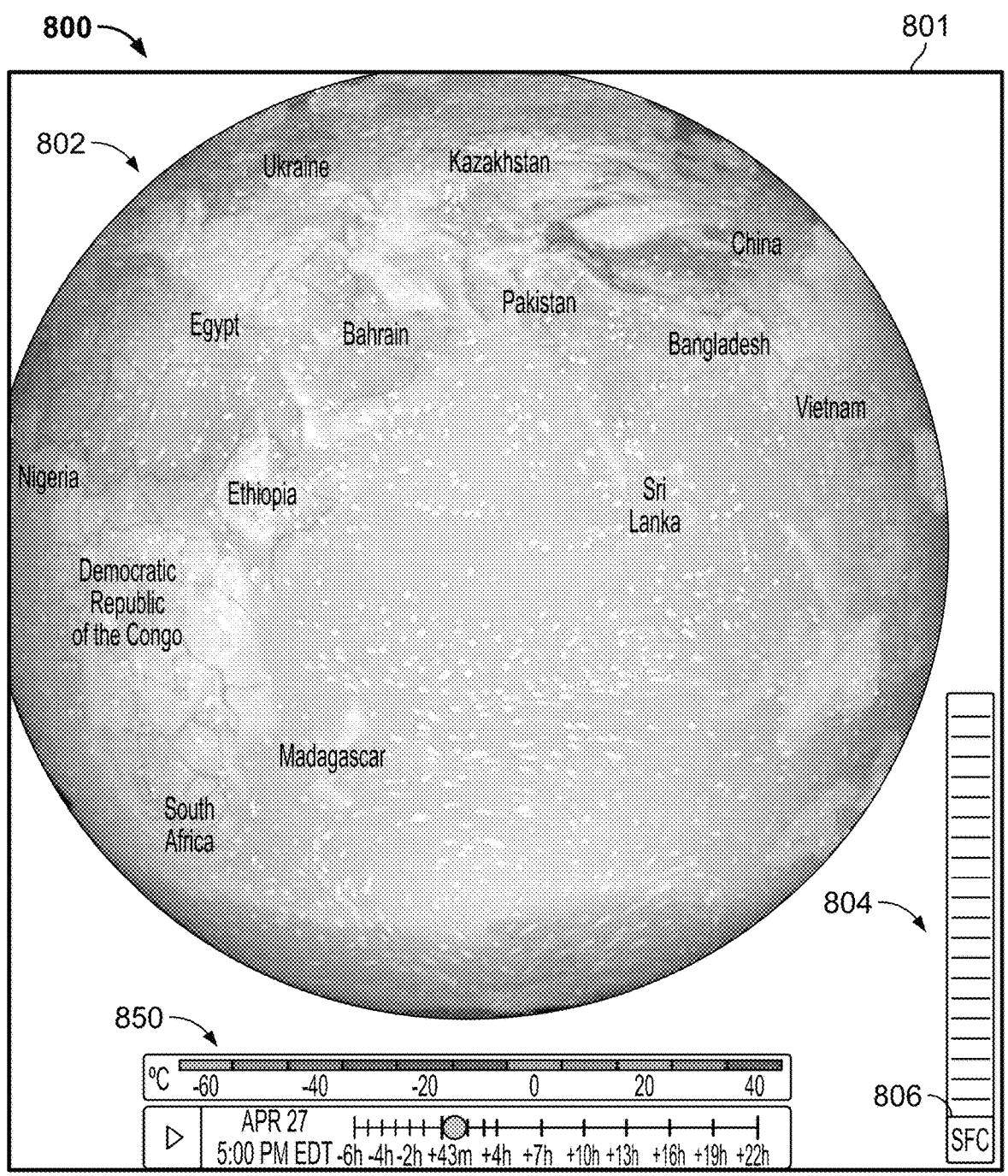
FIG. 8A is a screenshot of an exemplary graphical user interface for depicting wind temperature at surface level and a corresponding color-coded legend, in accordance with embodiments.
FIG. 8B is a close-up view of the color-coded legend of FIG. 8A, in accordance with embodiments.

Referring back to FIG. 3, the graphics engine 306 is further configured to use the dynamic legend block 322 to generate a weather legend based on the graphical code in block 320 and display the weather legend in association with the graphical representation of weather information on the map (e.g., a wind speed map layer as shown in FIG. 5A, or a wind temperature map layer as shown in FIG. 8A). The weather legend defines or explains the colors, or other graphics, that are displayed on the map to represent the weather information in accordance with the graphical code of block 320. For example, the weather legend may display a plurality of colors in association with text for respectively describing the attributes or weather values that correspond to each color. In various embodiments, block 322 may be configured to provide the weather legend as a table, chart, scale, bar, or any other suitable format, and may display the weather legend adjacent to or on top of the map, or in any other suitable location, and in any configuration relative to the weather forecast user interface (e.g., lengthwise, widthwise, etc.). In one exemplary embodiment, the weather legend is comprised of a plurality of blocks or segments configured to collectively form the legend (see, e.g., segments 552 of legend 550 in FIG. 5B), wherein each segment represents a different attribute of the retrieved weather information, for example, by displaying the unique color assigned to that attribute by the color code.

The graphics engine 306, and/or the dynamic legend block 322, is also configured to dynamically alter or update the weather legend as new weather information is received, so that the content and specificity (or level of detail) of the legend is consistent with that of the displayed weather information. In embodiments, the overall range of weather values displayed in a given map layer may change upon receiving a new altitude input 312, a new geographical location input 310, and/or a new time input 308. For example, as shown in FIGS. 8A through 11B, wind temperature values at higher altitudes (e.g., 39,000 feet) may span a range that is below freezing (e.g., −32° C. to −70° C.), whereas wind temperature values at lower altitudes (e.g., surface level) may cover a more expansive range (e.g., 40° C. to −60° C.), depending on the selected geographical region. The weather values displayed in a given map layer may also change as the map view changes, for example, to show a different geographical area, a different level of detail (or zoom level), or a different window or screen size.

Accordingly, the graphics engine 306 can dynamically adjust the range of values represented by the weather legend (also referred to herein as a "dynamic legend") to be more expansive or more focused, or to shift the range to a new or overlapping set of values, as needed. For example, the graphics engine 306 may be configured to adjust the weather legend whenever the newly received weather information has a maximum weather value and/or a minimum weather value that differs from the range of values currently represented by the legend. The graphics engine 306 may also adjust the dynamic legend in response to changes to an overall size of the display screen on which the GUI is displayed, or an overall size of the application window associated with the GUI. These adjustments may cause, for example, a change in the text and corresponding colors (or other graphics) that are displayed in the dynamic legend, a change in the overall size of the legend (e.g., length and width), a change in the total number of weather values and/or colors represented by the legend, a change in the overall variety of colors and weather values included in the legend, and/or a change in the number and/or size of the segments that make up the legend. For example, the graphics engine 306 may zoom in or out on the color scale presented by the weather legend in order to better represent the range of weather values being currently displayed on the map.

In the following paragraphs, these and other aspects of the dynamic legend will be described in more detail with reference to FIGS. 5A through 13, which show exemplary graphical user interfaces ("GUIs") for implementing various aspects of the weather forecast user interface on an electronic device. In embodiments, one or more of these GUIs may be generated or provided by the system 300 and displayed on a display screen of the client device 102 for presentation to the user, as described herein. While the illustrated embodiments depict GUIs with particular shapes and sizes configured for presentation on various mobile computing devices, such as, e.g., a tablet, a smartphone, or the like, it is contemplated that the techniques described herein can also be used to provide GUIs having other formats or configurations to accommodate other types of electronic devices and/or display screen sizes, such as, for example, personal computers, laptops, stand-alone display screens, televisions and other media devices. Also, it should be appreciated that the graphical user interfaces shown herein are merely exemplary and can comprise various other details, arrangements, and/or selectable options.

According to embodiments, the graphical user interfaces shown in FIGS. 5A through 13 are substantially similar in overall design and operation but differ in terms of content, due to a difference in the inputs received at the input module 302 (e.g., location 310, altitude 312, and/or map layer 314) and/or a difference in the size of the display screen on which the GUI is presented. For the sake of brevity, the dynamic legend of block 322, and the GUI on which it is presented, will be primarily described with respect to FIGS. 5A and 5B, but it should be appreciated that similar techniques apply to the legends and GUIs shown in FIGS. 6A through 13.

FIGS. 5A through 7B depict a first set of exemplary graphical user interfaces for presenting wind speed information at various altitudes, as well as corresponding wind speed legends, while FIGS. 8A through 11B depict a second set of exemplary graphical user interfaces configured to display wind temperature information at various altitudes, as well as corresponding wind temperature legends, in accordance with embodiments.

Referring initially to FIG. 5A, shown is a first graphical user interface ("GUI") 500 displayed on a display screen 501 configured to graphically display weather information for a plurality of geographical locations on a first geographical map 502 using various colors selected in accordance with a color code. The first GUI 500 is further configured to display a weather legend 550 for dynamically defining the colors displayed on the map 502 in accordance with the color code. In the illustrated embodiment, the displayed weather information is wind speed information color-coded according to a wind speed color code (such as, e.g., the wind speed color code shown in table 450 of FIG. 4B), and the weather legend 550 is a wind speed legend for defining the numerical wind speed, or number of knots, associated with each color displayed on the map 502. In other embodiments, (e.g., as shown in FIGS. 8A through 11B), the displayed weather information may be wind temperature information color-coded according to a wind temperature color code (such as, e.g., the wind temperature color code shown in table 400 of FIG. 4A), and the weather legend 550 may be a wind temperature legend for defining the numerical wind temperature (e.g., in Celsius or Fahrenheit) associated with each color displayed on the map 502.

Figure 5B:
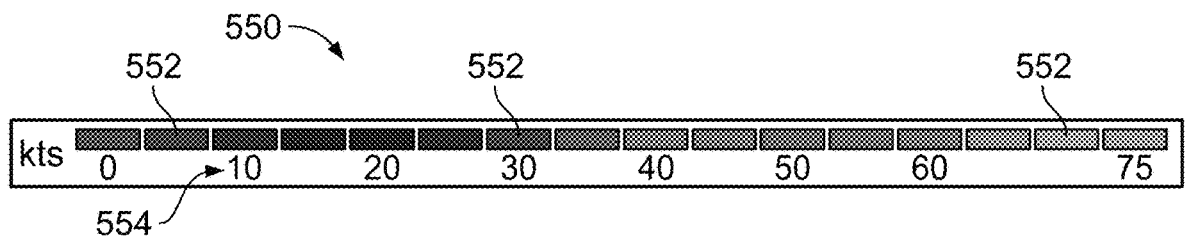
FIG. 5B is a close-up view of the color-coded legend of FIG. 5A, in accordance with embodiments.

As shown in FIG. 5B, the weather legend 550 (or "dynamic legend") is comprised of a plurality of blocks or segments 552 that that are uniformly sized and shaped, and are arranged to collectively form the legend 550. In the illustrated embodiment, the segments 552 are substantially rectangular in shape and are arranged substantially parallel to a horizontal axis of the map 502, so as to form a bar across a length of the first map 502. In other embodiments, the segments 552 may be vertically aligned (or substantially parallel to a vertical axis of the map 502), so as to form a column along one side of the first map 502. In some embodiments, the segments 552 may have other shapes (e.g., square, circle, oval, triangle, square, hexagon, etc.) and/or may be arranged in other configurations (e.g., a square or rectangular box, a circle or oval shape, etc.).

According to embodiments, certain characteristics of the segments 552 and/or the legend 550 may be determined based on one or more variable factors and thus, may be automatically updated or altered as the one or more factors change. For example, the exact size (e.g., length and/or width) of each segment 552 may be determined based on a total number of segments 552 included in the legend 550 and an overall size (e.g., length and/or width) of the legend 550. The total number of segments 552 included in the legend 550 may vary depending on, for example, an overall range of attributes (or weather values) represented by the legend 550 (e.g., a numerical difference between a minimum value of the range and a maximum value of the range), a level of specificity desired for the legend 550 (e.g., the total number of attributes to be represented), the type of weather information being displayed on the map 502 (e.g., wind speed versus wind temperature), and/or the overall size of the legend 550 (e.g., total length and/or width). The overall size of the legend 550 may vary depending on, for example, an amount of available space within the GUI 500 for the legend 550, a size of the application window in which the GUI 500 resides, and/or a size of the display screen on which the GUI 500 is displayed (e.g., a laptop screen versus a tablet screen versus a mobile phone screen). Thus, in embodiments, the dynamic characteristics of the legend 550 may include, for example, segment size, a total number of segments, and overall legend size. In other embodiments, other characteristics of the legend 550 may be dynamically controlled, additionally or alternatively, including, for example, an amount of spacing between adjacent segments 552, a placement of the legend 550 on the GUI 500, a font size of the legend 550, or any other variable characteristic.

Color can also be a dynamic characteristic of the legend 550. For example, each segment 552 may contain or display a unique color for representing a specific attribute, or weather value, in accordance with the color code. As shown, the segments 552 may be arranged in a color sequence that generally mimics the colors of a rainbow (e.g., red, orange, yellow, green, blue, indigo, violet) but also includes various intermediate shades of those colors. The exact colors included in the legend 550 may vary depending on the minimum and maximum weather values represented by the legend 550, a numerical difference between the minimum and maximum values (or range of values), the total number of segments 552 that are included in the legend 550, a size of each segment 552, a level of detail or specificity selected for the legend 550, and/or any other factor related to presentation of weather information or generation of the weather legend 550.

As illustrated, a select group of the segments 552 may have corresponding labels 554 for explaining the specific attributes (e.g., 0, 10, 20, 30, 40, 50, 60, and 75 kts) represented by the segments 552 of that group. The labels 554 may be alphanumeric text, as shown, icons, or other graphics associated with the specified attributes. While FIG. 5B shows about half of the segments 552 being associated with labels 554 in a mostly alternating manner, in other embodiments, more or fewer segments 552 may have labels 554. Moreover, while the illustrated embodiment shows the labels 554 underneath the segments 552, in other embodiments, the labels 554 may be placed above, on top of, or inside the corresponding segments 552, or at any other suitable location relative to the segments 552. The content of the segment labels 554 may vary depending on, for example, type of weather value or other attribute, the type of units selected for the weather values (e.g., knots versus miles/second or miles/hour for wind speed; Fahrenheit versus Celsius for wind temperature, etc.), the overall range of values represented by the legend 550 (e.g., the minimum and maximum values), and/or the level of specificity selected for the legend 550 (e.g., the total number of segments being displayed).

As shown in FIG. 5A, the first GUI 500 further includes an altitude selector 504 for enabling a user to input, change, or otherwise select an altitude value for the weather information displayed on the map 502 (e.g., the altitude input 312 shown in FIG. 3). In the illustrated embodiment, the altitude selector 504 comprises a user-selectable slider 506 disposed on, or adjacent to, a vertical scale 508 comprised of a plurality of markers 510 corresponding to different altitude levels (e.g., Surface or 0 feet ("SFC"), 6,000 feet ("6K"), 39,000 feet ("39K"), 63,000 feet ("63K"), etc.). The slider 506 may be movable (e.g., up or down) relative to the scale 508 and may be moved to any one of the markers 510 to indicate user selection of the corresponding altitude level. In some embodiments, the slider 506 may also be movable to "half positions" or a location disposed between two adjacent markers 510, to enable more precise altitude selection. While the illustrated embodiment shows the altitude selector 504 as a vertical column, it should be appreciated that, in other embodiments, the altitude selector 504 can be configured as a horizontal bar or any other suitable configuration. Also in other embodiments, the altitude selector 504 may include other user input techniques (e.g., buttons, keyboard, etc.) for enabling user selection of an altitude value.

The altitude selector 504 is further configured to display the selected altitude value using alphanumeric text or other graphic associated with the value. For example, in the illustrated embodiment, the slider 506, itself, displays the selected altitude value, which is the value associated with the marker 510 on which the slider 506 is disposed. In other embodiments, the selected altitude value may be displayed adjacent to the selected marker 510, adjacent to the scale 508, and/or in any other suitable location. In either case, the displayed altitude value may change as the slider 506 moves to a new marker 510 or other location on the scale 508 (e.g., as shown in FIGS. 6A and 7A). In some embodiments, instead of displaying only the selected altitude value, multiple markers 510 may be labeled with alphanumeric text, or other graphic, for indicating the various altitude values associated with those markers 510. In such cases, the selected altitude value may be indicated by highlighting the corresponding text and/or marker 510.

In embodiments, upon receiving a new altitude selection via the altitude selector 504 (e.g., new altitude input 312), one or more aspects of the displayed weather information may change accordingly, which may cause a corresponding change in one or more aspects of the dynamic legend 550. In particular, FIGS. 5A through 7B provide exemplary illustrations of how displayed wind speed information and the contents of the accompanying wind speed legend can change as the altitude value changes.

Starting with FIG. 5A, the slider 506 is disposed at a first position on the scale 508 of the altitude selector 504, the first position corresponding to an altitude value of zero feet, or surface level. Accordingly, the geographical map 502 displays wind speed information, at surface level, for each of the plurality of geographical locations shown on the map 502, using appropriate colors from the wind speed color code. As also shown in FIG. 5B, the accompanying wind speed legend 550 defines the colors specifically shown on the map 502 by displaying a range of wind speed values in association with the colors assigned to each of those values by the color code, and by configuring the range of wind speed values (e.g., 0 to 75 kts) to include the minimum and maximum wind speed values displayed on the map 502.

Figure 6B:
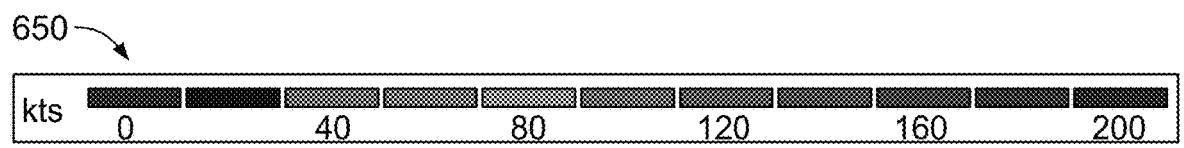
FIG. 6B is a close-up view of the color-coded legend of FIG. 6A, in accordance with embodiments.

FIG. 6A depicts a second graphical user interface ("GUI") 600 that is displayed on a display screen 601 and is substantially similar to the first GUI 500, except that: (a) slider 606 of altitude selector 604 has been moved to a second position that corresponds to an altitude value of 39,000 feet (e.g., as indicated by the "39K" text displayed on the slider 606), (b) geographical map 602 displays wind speed information at 39,000 feet, for the same general geographical locations shown on map 502, and (c) legend 650 shows a larger spectrum of colors in order to represent the wider range of wind speed values depicted on the map 602, as compared to map 502 of FIG. 5A. In particular, the legend 650 is configured to define the colors on the map 602 that correspond to wind speed values of approximately 0 knots to approximately 200 knots, as also shown in FIG. 6B.

Figure 7B:
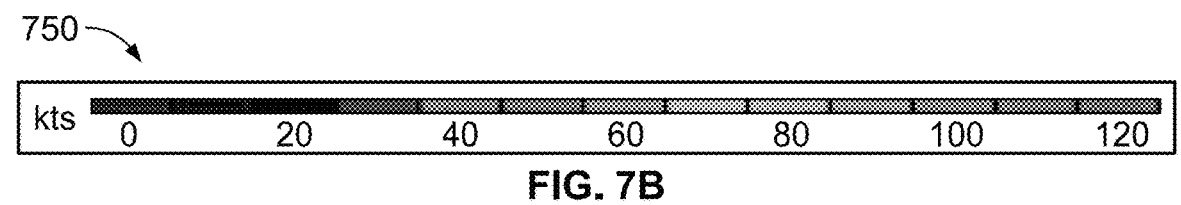
FIG. 7B is a close-up view of the color-coded legend of FIG. 7A, in accordance with embodiments.

Likewise, FIG. 7A depicts a third graphical user interface ("GUI") 700 that is displayed on a display screen 701 and is substantially similar to the first and second GUIs 500 and 600, except that: (a) a slider 706 of an altitude selector 704 has been moved to a third position that corresponds to an altitude value of 63,000 feet (e.g., as indicated by the "63K" text displayed on the slider 706), (b) geographical map 702 displays wind speed information at 63,000 feet for the same general geographical locations shown on map 602, and (c) legend 750 shows a different spectrum of colors in order to represent the different range of wind speed values presented on the map 702, as compared to maps 502 and 602. Specifically, the legend 750 is configured to define the colors on the map 702 that correspond to wind speed values of approximately 0 knots to approximately 120 knots, as also shown in FIG. 7B.

Referring now to FIGS. 8A through 11B, shown are exemplary illustrations of how displayed wind temperature information and one or more aspects of an accompanying weather temperature legend can change as the altitude value changes. In particular, FIG. 8A illustrates a fourth graphical user interface ("GUI") 800 that is displayed on a display screen 801 and is substantially similar to the first GUI 500, except that geographical map 802 displays weather temperature information for the same general geographical locations as map 502, and dynamic weather legend 850 defines the colors shown on the map 802 in accordance with a wind temperature color code (e.g., wind temperature color code 400 in FIG. 4A). As also shown in FIG. 8B, the legend 850 is specifically configured to define the colors that correspond to wind temperature values of approximately −60° C. to approximately 40° C., in order to encompass the minimum and maximum wind temperature values displayed on the map 802. The fourth GUI 800 also includes an altitude selector 804 with a slider 806 disposed at a first position corresponding to an altitude value of zero, or surface level, similar to the altitude selector 504 of FIG. 5A.

Figure 9A:
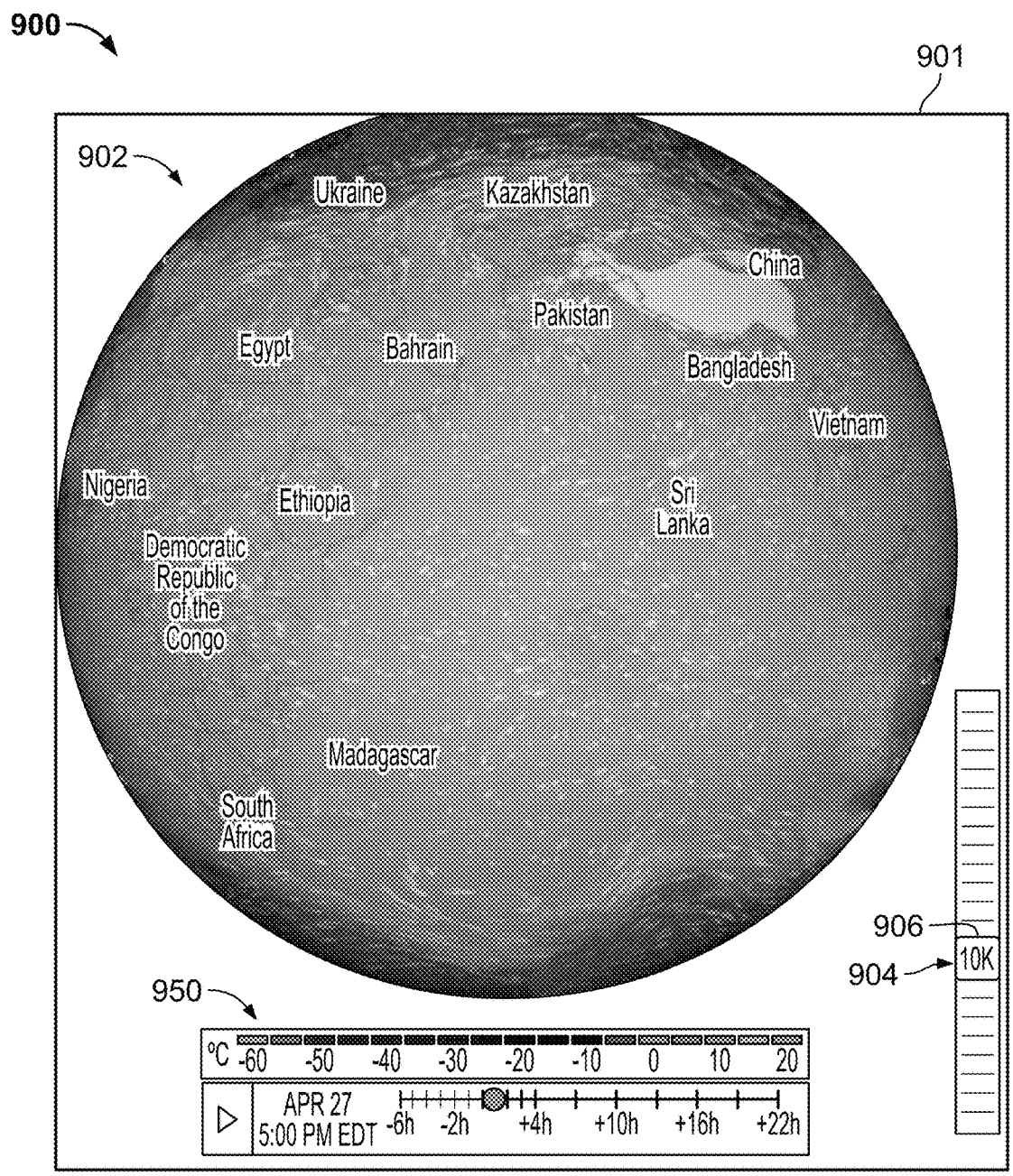
FIG. 9A is a screenshot of an exemplary graphical user interface for depicting wind temperature at 10,000 feet above sea level and a corresponding color-coded legend, in accordance with embodiments.
Figure 9B:
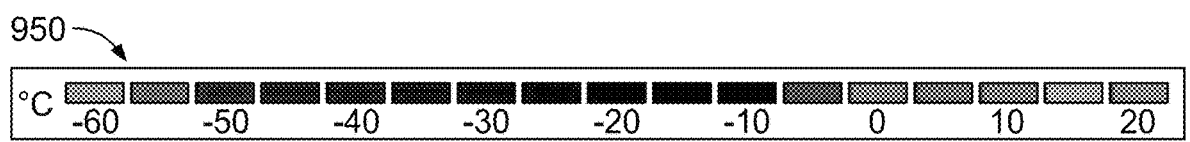
FIG. 9B is a close-up view of the color-coded legend of FIG. 9A, in accordance with embodiments.

FIG. 9A depicts a fifth graphical user interface ("GUI") 900 that is displayed on a display screen 901 and is substantially similar to the fourth GUI 900, except that: (a) slider 906 of altitude selector 904 has been moved to a fourth position that corresponds to an altitude value of 10,000 feet (e.g., as indicated by the "10K" text displayed on the slider 906), (b) geographical map 902 displays wind temperature information at 10,000 feet for the same general geographical locations shown on map 802, and (c) legend 950 shows a smaller spectrum of colors in order to represent the narrower range of wind temperature values depicted on the map 902, as compared to map 802 of FIG. 8A. In particular, the legend 950 is configured to define the colors on the map 902 that correspond to wind temperature values of approximately −60'C to approximately 20° C., as also shown in FIG. 9B.

Figure 10A:
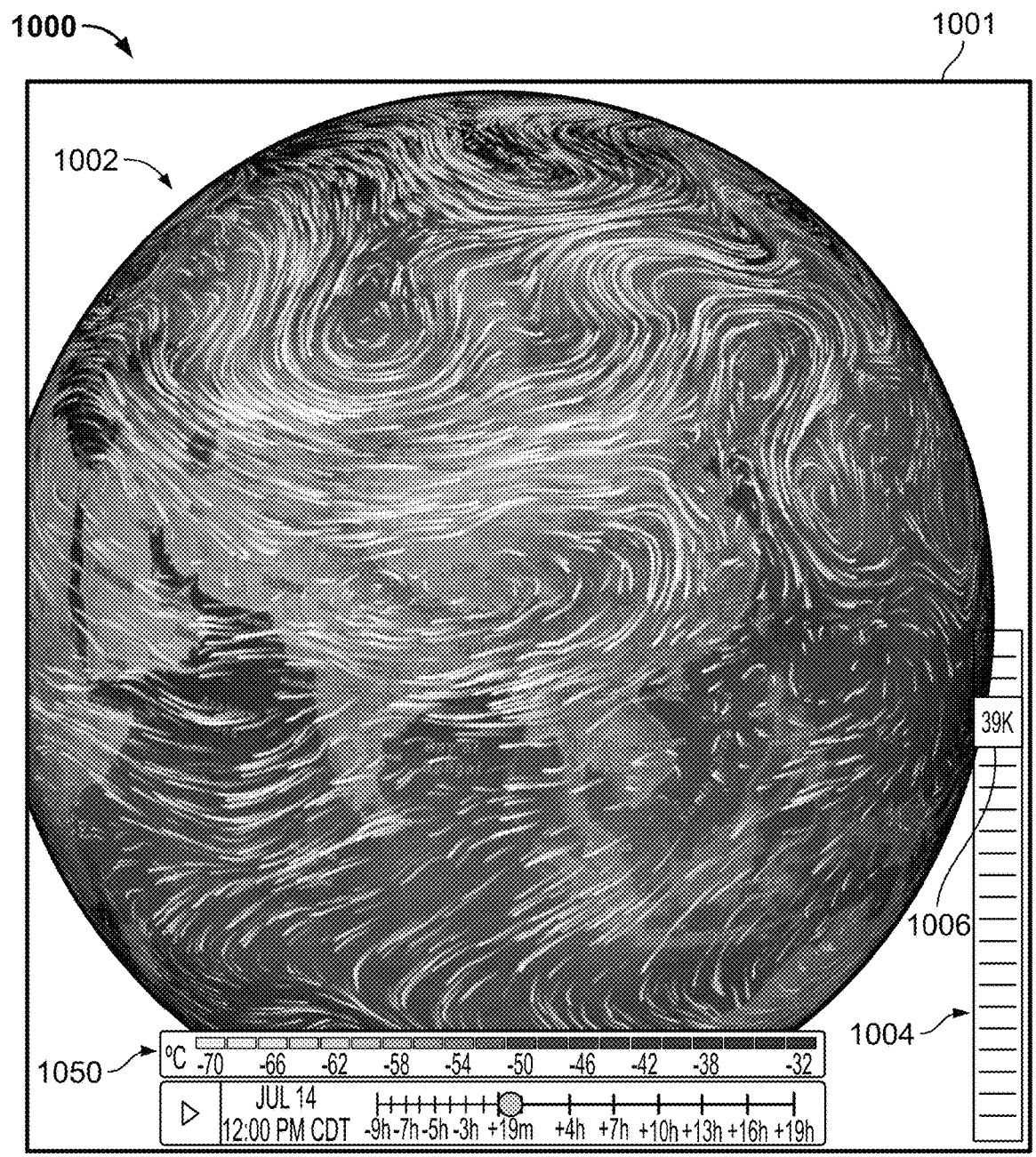
FIG. 10A is a screenshot of an exemplary graphical user interface for depicting wind temperature at 39,000 feet above sea level and a corresponding color-coded legend, in accordance with embodiments.
Figure 10B:
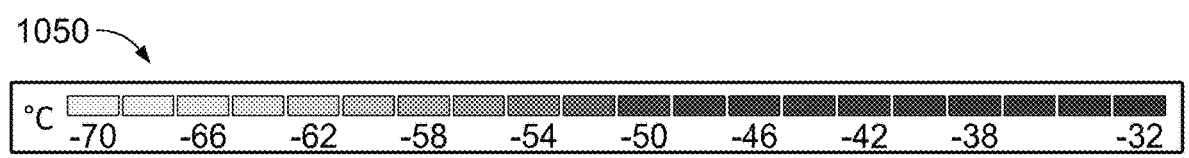
FIG. 10B is a close-up view of the color-coded legend of FIG. 10A, in accordance with embodiments.

Likewise, FIG. 10A depicts a sixth graphical user interface ("GUI") 1000 that is displayed on a display screen 1001 and is substantially similar to the fourth and fifth GUIs 800 and 900, except that: (a) a slider 1006 of an altitude selector 1004 has been moved to the second position (e.g., as also shown in FIG. 6A), which corresponds to the altitude value of 39,000 feet, as indicated by the "39K" text displayed on the slider 1006), (b) geographical map 1002 displays wind temperature information at 39,000 feet for the same general geographical locations shown on map 802, and (c) legend 1050 shows a different spectrum of colors in order to represent the different range of wind temperature values presented on the map 1002, as compared to maps 802 and 902. Specifically, the legend 1050 is configured to define the colors on the map 1002 that correspond to wind temperature values of approximately −70° C. to approximately −32° C., as also shown in FIG. 10B.

Figure 11A:
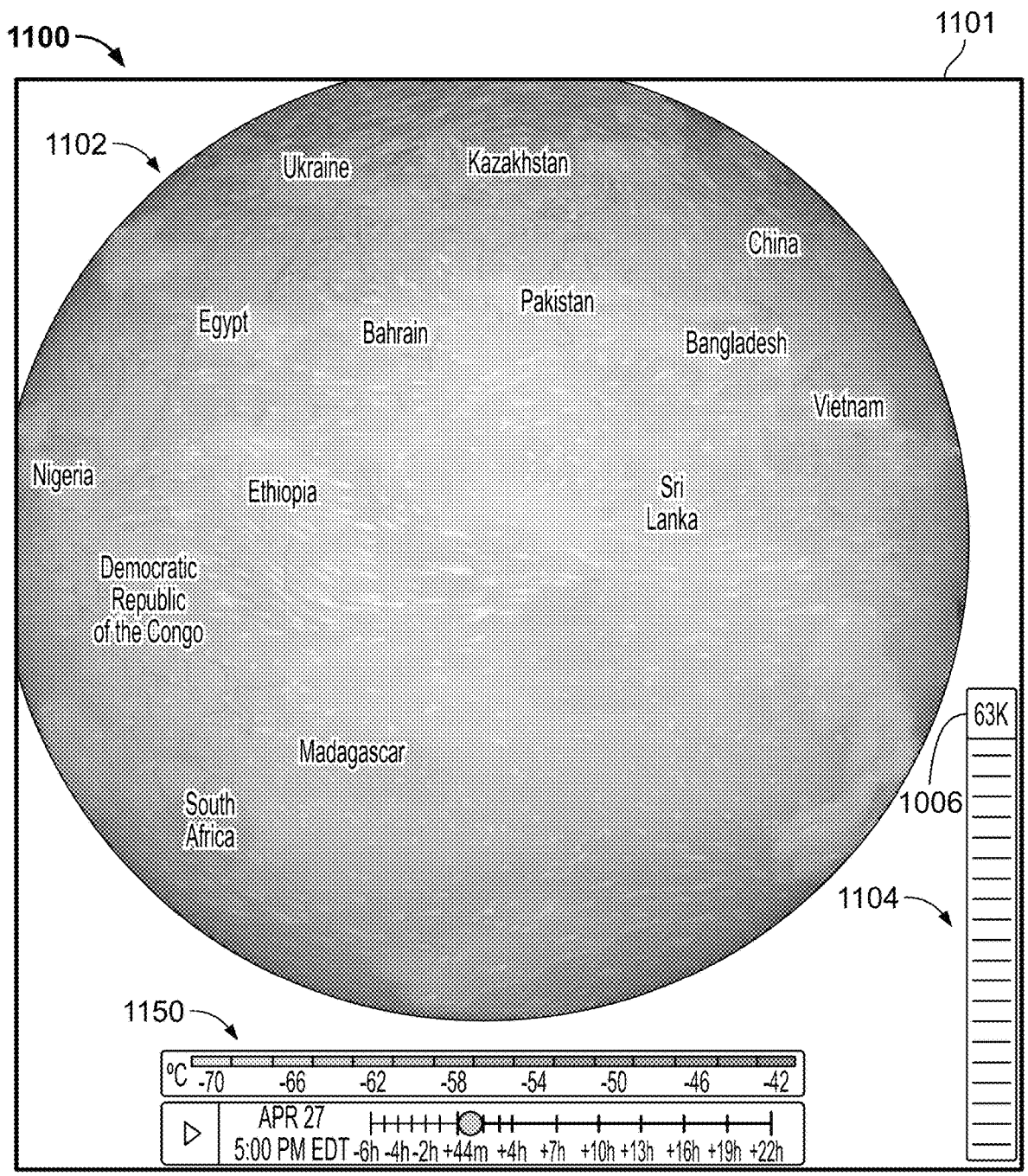
FIG. 11A is a screenshot of an exemplary graphical user interface for depicting wind temperature at 63,000 feet above sea level and a corresponding color-coded legend, in accordance with embodiments.
Figure 11B:
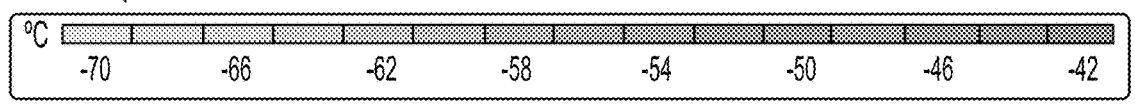
FIG. 11B is a close-up view of the color-coded legend of FIG. 11A, in accordance with embodiments.

Similarly, FIG. 11A depicts a seventh graphical user interface ("GUI") 1100 that is displayed on a display screen 1101 and is substantially similar to the fourth, fifth, and sixth GUIs 800, 900 and 1000, except that: (a) a slider 1106 of an altitude selector 1004 has been moved to the third position (e.g., as also shown in FIG. 7A), which corresponds to the altitude value of 63,000 feet, as indicated by the "63K" text displayed on the slider 1106), (b) geographical map 1102 displays wind temperature information at 63,000 feet for the same general geographical locations shown on map 802, and (c) legend 1150 shows a smaller spectrum of colors in order to represent the narrower range of wind temperature values presented on the map 1102, as compared to map 1002. Specifically, the legend 1150 is configured to define the colors on the map 1102 that correspond to wind temperature values of approximately −70° C. to approximately −42° C., as also shown in FIG. 11B.

Figure 12:
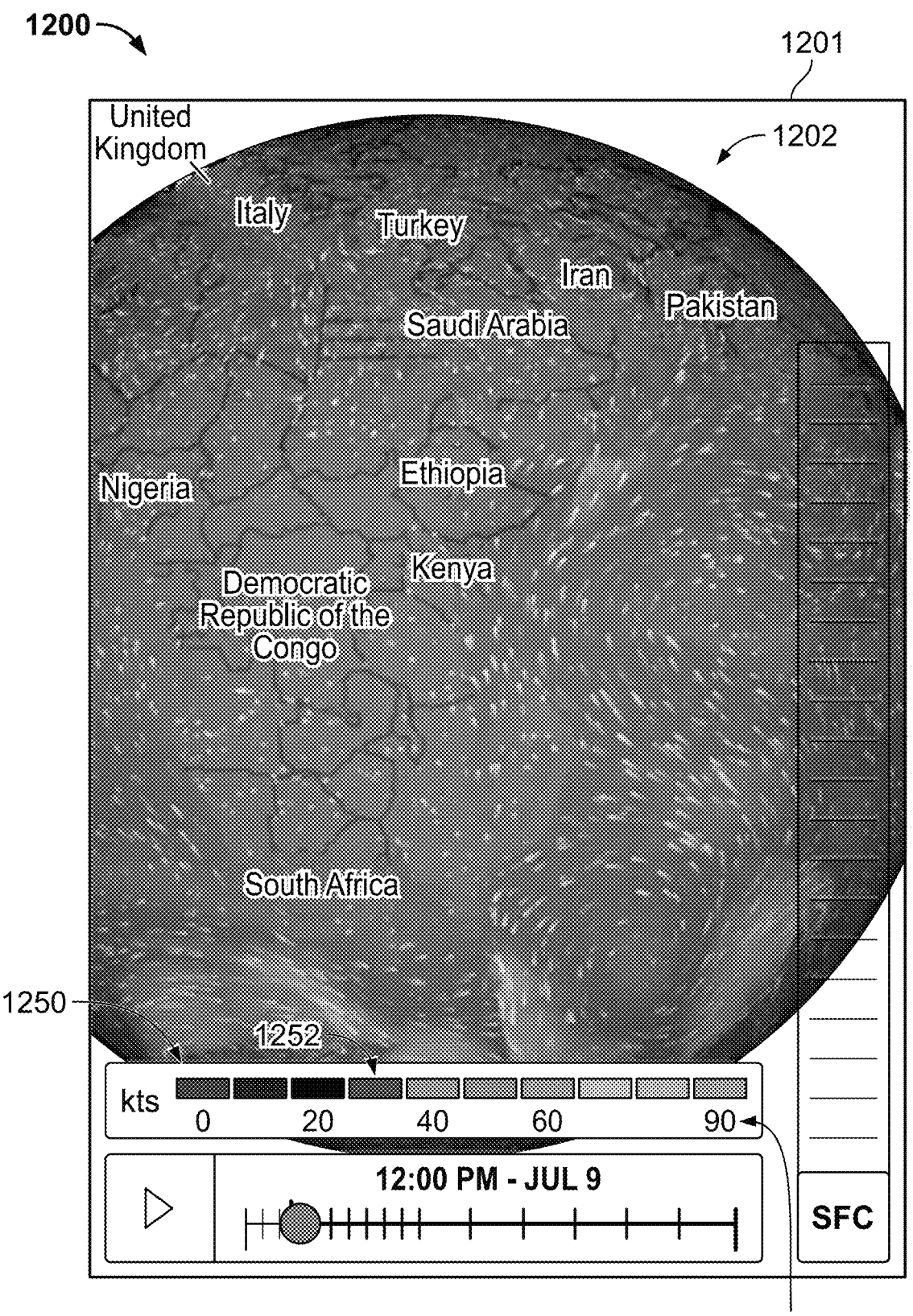
FIG. 12 is a screenshot of another exemplary graphical user interface for depicting wind speeds at surface level and a corresponding color-coded legend, in accordance with embodiments.
Figure 13:
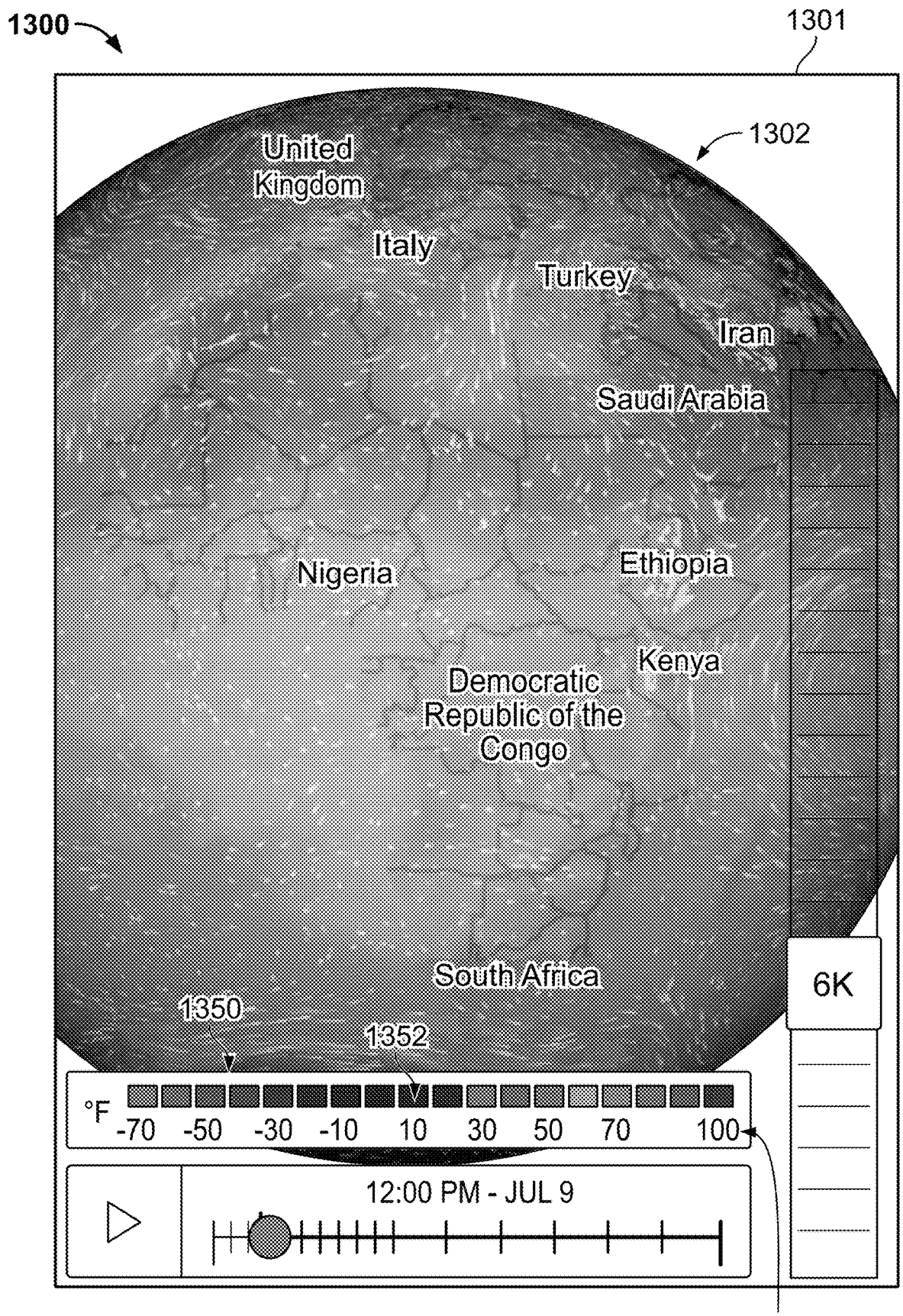
FIG. 13 is a screenshot of an exemplary graphical user interface for depicting wind temperature at 6,000 feet above sea level and a corresponding color-coded legend, in accordance with embodiments.

According to some embodiments, FIGS. 5A through 11B depict graphical user interfaces that are configured for presentation on a first electronic device, such as, but not limited to, a tablet, laptop, desktop computer, or other device with a relatively larger display screen. In comparison, FIGS. 12 and 13 depict similar graphical user interfaces but configured for presentation on a second electronic device, such as, but not limited, a smartphone, mobile phone or other mobile computing device with a relatively smaller display screen. In such cases, the dynamic legend may be configured for, or adapted to, the smaller display screen as well, for example, by reducing an overall size (e.g., length and/or width) of the legend, the total number of segments in the legend, a size of the segments that make up the legend, and/or a level of detail or specificity of the legend.

As an example, FIG. 12 depicts an eighth graphical user interface ("GUI") 1200 that is displayed on a display screen 1201 and is configured to display wind speed information for a plurality of geographical locations, at surface level, on a geographical map 1202, as well as a corresponding wind speed legend 1250, in accordance with embodiments. In particular, the legend 1250 is configured to define the colors on the map 1202 that correspond to wind speed values of approximately 0 knots to approximately 90 knots. Overall, the eighth GUI 1200 may be similar to the first GUI 500 in FIG. 5A, except that the GUI 1200, and accompanying legend 1250, is configured for display on an electronic device with a smaller display screen. For example, the wind speed legend 1250 has an overall length that is smaller or shorter than the overall length of the legend 550, due to the smaller display size of the second electronic device. In addition, each segment 1252 of the legend 1250 is shorter in length, e.g., as compared to the segments 552, in order to reduce the overall length of the legend 1250 while still covering the depicted range of wind speed values. Also, the level of specificity of the legend 1250 has been adjusted (e.g., reduced) in order to accommodate a slightly wider range of wind speed values, as compared to legend 550, into a smaller sized legend. For example, fewer shades of color are shown in the legend 1250 because the total number of segments 1252 in the legend 1250 is less than the total number of segments 552 in the legend 550. Also, the legend 1250 includes labels 1254 at larger numerical intervals than the labels 554 shown in FIG. 5B.

As another example, FIG. 13 depicts a ninth graphical user interface ("GUI") 1300 that is displayed on a display screen 1301 and is configured to display wind temperature information for a plurality of geographical locations, at an altitude value of 6,000 feet, on a geographical map 1302, as well as a corresponding wind temperature legend 1350, in accordance with embodiments. In particular, the legend 1350 is configured to define the colors on the map 1302 that correspond to wind temperature values of approximately −70° F. to approximately 100° F. Overall, the ninth GUI 1300 may be similar to the fourth GUI 800 in FIG. 8A, except that the GUI 1300, and accompanying legend 1350, is configured for display on the second electronic device with smaller display screen, like the GUI 1200 of FIG. 12. Accordingly, the wind temperature legend 1350 has an overall length that is smaller or shorter than the overall length of the legend 850, due to the smaller display size of the second electronic device. In addition, the level of specificity of the legend 1350 has been adjusted (e.g., reduced) in order to accommodate a wider range of wind temperature values, as compared to legend 850, into a smaller sized legend. For example, the total number of segments 1352 in the legend 1350 is larger than the total number of segments 852 in the legend 850 because a broader spectrum of colors is required to cover the range of wind temperature values shown on the map 1302. At the same time, each segment 1352 of the legend 1350 is shorter in length, e.g., as compared to the segments 852, in order to reduce the overall length of the legend 1350 while still covering the depicted range of wind speed values. As shown in FIG. 13, these factors, in combination, caused an overall shape of each segment 1352 to be compressed into a square-like shape, as compared to the longer rectangular segments 852 shown in FIG. 8B.

Referring back to FIG. 5A, the first GUI 500 may also include a time scale 512 configured to enable the user to enter, change, or otherwise select a time value (e.g., time input 308 of FIG. 3) for the weather information displayed on the map 502. In some embodiments, the dynamic legend 550 may be configured to change as the weather information displayed on the map 502 changes in response to a change in time value (e.g., day, hour, minutes, etc.). In other embodiments, the legend 550 may remain static as the user manipulates the time scale 512 to select a new time value.

FIG. 14 illustrates an example process or method 1400 for dynamically adjusting a legend of a graphical user interface using an electronic device, in accordance with embodiments. The method 1400 can be carried out by the electronic device, alone or in combination with one or more other computing devices. Said device(s) may include, for example, computing device 200 shown in FIG. 2 and/or one or more computing devices of the system 100 shown in FIG. 1. The functionalities of the method 1400 can be implemented, at least in part, by a processor of the electronic device (e.g., processor 202 shown in FIG. 2) executing a software application stored in a memory (e.g., memory 204 shown in FIG. 2). In embodiments, the software application may be the dynamic legend application included in the one or more applications 214 of FIG. 2, or a portion thereof, as described with reference to system 300 of FIG. 3. In some embodiments, the application may be a computer program stored on a non-transitory computer readable medium that is executable by a processor of the device.

To further carry out the operations of method 1400, the electronic device can interact or interface with one or more external devices communicatively coupled thereto, such as, for example, a remote server (e.g., remote server 104 in FIG. 1), as well as employ one or more internal devices, such as, e.g., a display unit (e.g., display screen 206 shown in FIG. 2) and/or a user input device (e.g., I/O unit 210 in FIG. 2). For example, upon carrying out the method 1400, the processor can cause the display screen to display a graphical user interface, such as the weather forecast user interface (e.g., one or more of the graphical user interfaces shown in FIGS. 5A through 13), and can cause a change in one or more aspects of the graphical user interface, such as a weather legend displayed therein, based on one or more inputs received via the user input device. As another example, the data associated with, or presented by, the graphical user interfaces can be retrieved from the remote server and/or one or more databases (e.g., storage device 108 in FIG. 1).

As shown in FIG. 14, the method 1400 may begin with step 1402, which includes receiving, via the user input device, a first input indicating a first altitude value. The first input may be for example, the altitude input 312 received at the input module 302 of FIG. 3. In some embodiments, step 1402 may further include receiving one or more additional inputs via the user input device, such as, but not limited to, a location input indicating one or more geographic locations (e.g., location input 310 of FIG. 3), a weather type input indicating a type of weather information (e.g., map layer input 314 of FIG. 3), and/or a time input indicating a time value (e.g., time input 308 of FIG. 3).

Step 1404 includes retrieving, via the one or more processors, weather information corresponding to the first input. The weather information may be, for example, wind temperature information (e.g., wind temperature information 316 of FIG. 3), wind speed information (e.g., wind speed information 318 of FIG. 3), or any other weather-related information that corresponds to (or can be measured at) the first altitude value. In some embodiments, step 1404 includes retrieving a wind temperature value or a wind speed value for at least one geographical location and at the first altitude value. In such embodiments, the at least one geographical location may be selected based on the location input (e.g., location input 310 of FIG. 3), and the type of weather value (e.g., wind temperature or wind speed) may be selected based on the weather type input (e.g., map layer input 314 of FIG. 3). The weather information may be retrieved from an external weather service (e.g., weather service component 110 of FIG. 1), a remote server (e.g., remote server 104 of FIG. 1), a database or datastore (e.g., storage device 108 of FIG. 1), and/or a memory (e.g., memory 204 of FIG. 2). In some embodiments, the weather information may be retrieved by the information module 304 of FIG. 3 in response to receiving the first input at the input module 302.

Step 1406 includes generating, using the one or more processors, a legend having a color-code or shading-code associated with a plurality of attributes included in the retrieved weather information, and generating a command signal for displaying the legend. For example, the command signal may be configured to cause the display unit (e.g., display screen 206 of FIG. 2) to display the legend. The legend (e.g., dynamic weather legend 550 of FIG. 5B) may comprise a plurality of blocks or segments (e.g., segments 552 of FIG. 5A) configured to collectively form the legend, each segment representing a different attribute of the retrieved weather information. The color code may be, for example, a wind speed color code (e.g., color code 450 shown in FIG. 4B), a wind temperature color code (e.g., color code 400 shown in FIG. 4A), or any other color-coded system suitable for visually indicating the attributes of the weather information. Likewise, the shading code may be any shading-based code, including any of the graphics codes described herein. In some embodiments, step 1406 further comprises generating the legend by assigning a unique color or shading to each block or segment of the weather legend according to the color-code or shading-code.

In some embodiments, step 1406 further comprises generating the legend by identifying a minimum value and a maximum value of the plurality of attributes included in the retrieved weather information, and determining a total number of segments to include in the legend based on the minimum and maximum values, in order to tailor the legend to the retrieved weather information. As described herein, using these and other techniques, the content and specificity of the legend can be altered, as needed, to resemble the range of attributes included in the retrieved weather information. For example, a first legend (e.g., legend 550 of FIG. 5B) may be configured to define a narrower range of wind speed values (e.g., 0 to 75 knots) with a greater amount of specificity by including a larger number of segments within the defined legend space, while a second legend (e.g., legend 650 of FIG. 6B) may be configured to define a wider range of wind speed values (e.g., 0 to 200 knots) with less specificity by including a smaller number of segments within the defined legend space.

Step 1406 may also include generating the legend by determining a dimension of each segment of the legend based on an identification of a display size of the display unit, and determining the total number of segments based further on the identification of the display size, in order to tailor the legend to the available amount of display space. For example, using such techniques, the legend can be configured to be longer in length when the graphical user interface is configured for display on a tablet, laptop, or other electronic device with a larger display screen (e.g., GUI 500 of FIG. 5A). Likewise, the legend can be configured to be shorter in length when the graphical user interface is configured for display on a smartphone, mobile computing device, or other electronic device with a smaller display screen (e.g., GUI 1200 of FIG. 12).

The method 1400 may also include step 1408, which includes displaying, on the display unit, the retrieved weather information on a map of the at least one geographical location using graphics in accordance with the color-code or the shading-code. For example, the map may be a geographical map (e.g., geographical map 502 of FIG. 5A), and the graphics may be various colors selected according to the color code to indicate the individual attribute, or weather value, associated with each location on the map. For example, in FIG. 7A, the area near Vietnam is a first color (e.g., purple) to indicate a first wind speed value of approximately zero knots, while the area near Democratic Republic of the Congo is a second color (e.g., blue) to indicate a second wind speed value of approximately 40 knots. As another example, in FIG. 8A, the area near Bangladesh is a third color (e.g., orange) to indicate a first wind temperature value of approximately 20° C., while the area near the Himalayan mountains (just north of Bangladesh) is a fourth color (e.g., indigo) to indicate a second wind temperature value of approximately −20° C.

Step 1410 of the method 1400 includes displaying the legend, on the display unit, in association with the retrieved weather information. For example, the legend may be displayed on top of, or adjacent to, the geographical map on which the color-coded weather information is displayed. In some embodiments, step 1410 further comprises displaying the legend by displaying the plurality of segments that collectively form the legend and represent respective attributes of the retrieved weather information.

In some embodiments, the method 1400 further comprises step 1412, which includes receiving, via the user input device, a second input indicating a second altitude value (e.g., 39,000 feet, as shown in FIG. 6A) that is different from the first altitude value (e.g., surface level, as shown in FIG. 5A). In such cases, the method 1400 may also include, at step 1414, retrieving, via the one or more processors, second weather information corresponding to the second altitude value, and at step 1416, altering, using the one or more processors, at least one characteristic of the legend based on the second weather information. In some embodiments, altering the at least one characteristic includes changing a total number of segments included in the legend based on the retrieved weather information (e.g., as can be seen by comparing legend 550 of FIG. 5B to legend 650 of FIG. 6B). In various embodiments, the at least one characteristic of the legend may comprise one or more of the following: one of the attributes represented by the legend and included in the retrieved weather information; a color or shading representing one of the attributes included in the retrieved weather information; a select one of the segments included in the legend; and/or an overall range of attributes represented by the legend.

In some cases, the method 1400 may end once the altered legend is displayed by the display unit. In other cases, the method 1400 may continue so long as new inputs are received that affect the displayed weather information and/or the weather legend.

Thus, the techniques described herein provide a weather forecast user interface, or other graphical user interface (GUI), configured to use color-coding or other graphical techniques to graphically present weather information on a geographical map and generate a dynamic weather legend for explaining the weather value assigned to each color on the map, so that the weather information can be readily understood (e.g., as compared to reading a list of locations and numbers). In addition, certain characteristics of the weather legend are dynamically alterable, for example, in response to receiving a new input (e.g., altitude, location, time, or weather information type) and/or determining an amount of available display area, so that the legend is focused on the specific range of weather values being displayed on the map.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIG. 14, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method for dynamically adjusting a legend of a graphical user interface using an electronic device comprising one or more processors, a user input device, and a display unit, the method comprising:
receiving, via the user input device, a first input indicating a first altitude value;
retrieving, via the one or more processors, weather information corresponding to the first input;
generating, using the one or more processors, a command signal for displaying a legend having a color-code or shading-code associated with a plurality of attributes included in the retrieved weather information;
displaying the legend, on the display unit, in association with the retrieved weather information;

receiving, via the user input device, a second input indicating a second altitude value different from the first altitude value;

retrieving, via the one or more processors, second weather information corresponding to the second altitude value; and altering, using the one or more processors, at least one characteristic of the legend based on the second weather information.

2. The computer-implemented method of claim 1, wherein the step of retrieving weather information comprises retrieving a wind temperature value or a wind speed value for at least one geographical location and at the first altitude value.

3. The computer-implemented method of claim 2, further comprising displaying, on the display unit, the retrieved weather information on a map of the at least one geographical location using graphics in accordance with the color-code or the shading-code.

4. The computer-implemented method of claim 1, wherein the step of displaying the legend comprises displaying a plurality of segments configured to collectively form the legend, each segment representing a different attribute of the retrieved weather information.

5. The computer-implemented method of claim 4, wherein the step of generating a command signal for displaying the legend comprises assigning a unique color or shading to each segment of the legend according to the color-code or shading-code.

6. The computer-implemented method of claim 4, wherein the step of generating a command signal for displaying the legend comprises:

identifying a minimum value and a maximum value of the plurality of attributes included in the retrieved weather information; and determining a total number of segments to include in the legend based on the minimum and maximum values.

7. The computer-implemented method of claim 6, wherein the step of generating a command signal for displaying the legend further comprises:

determining a dimension of each segment of the legend based on an identification of a display size of the display unit; and determining the total number of segments based further on the identification of the display size.

8. The computer-implemented method of claim 1, wherein the at least one characteristic of the legend comprises one of the attributes represented by the legend and included in the retrieved weather information.

9. The computer-implemented method of claim 1, wherein the at least one characteristic of the legend comprises a color or shading representing one of the attributes included in the retrieved weather information.

10. The computer-implemented method of claim 1, wherein the at least one characteristic of the legend comprises a select one of a plurality of segments configured to collectively form the legend, each segment representing a different attribute of the retrieved weather information.

11. The computer-implemented method of claim 1, the step of altering at least one characteristic of the legend comprises changing a total number of segments included in the legend based on the retrieved weather information.

12. The computer-implemented method of claim 1, wherein the at least one characteristic of the legend comprises an overall range of attributes represented by the legend.

13. A system comprising:

a display unit;

a user input device configured to receive a first input indicating a first altitude value and a second input indicating a second altitude value different from the first altitude value;

one or more processors; and memory configured to store one or more programs, the one or more programs being configured for execution by the one or more processors and including instructions for:

retrieving weather information corresponding to the first input;

generating a command signal for displaying a legend having a color-code or shading-code associated with a plurality of attributes included in the retrieved weather information;

displaying the legend, on the display unit, in association with the retrieved weather information;

retrieving second weather information corresponding to the second altitude value; and altering at least one characteristic of the legend based on the second weather information.

14. The system of claim 13, wherein the retrieved weather information comprises a wind temperature value or a wind speed value for at least one geographical location and at the first altitude value.

15. A non-transitory computer readable storage medium storing one or more programs, the one or more programs comprising instructions which, when executed by an electronic device comprising a user input device and a display unit, cause the electronic device to:

receive, via the user input device, a first input indicating a first altitude value;

retrieve weather information corresponding to the first input;

generate a command signal for displaying a legend having a color-code or shading-code associated with a plurality of attributes included in the retrieved weather information;

display the legend, on the display unit, in association with the retrieved weather information;

receive a second input indicating a second altitude value different from the first altitude value;

retrieve second weather information corresponding to the second altitude value; and alter at least one characteristic of the legend based on the second weather information.

16. The non-transitory computer readable storage medium of claim 15, wherein the retrieved weather information comprises a wind temperature value or a wind speed value for at least one geographical location and at the first altitude value.

17. The non-transitory computer readable storage medium of claim 16, wherein the instructions further cause the electronic device to display the retrieved weather information on a map of the at least one geographical location using graphics in accordance with the color code or the shading-code.

* * * * *